United States Patent
Yu

(10) Patent No.: US 12,220,632 B2
(45) Date of Patent: Feb. 11, 2025

(54) METHOD AND APPARATUS FOR EXECUTING INTERACTION EVENT

(71) Applicant: TENCENT TECHNOLOGY (SHENZHEN) COMPANY LIMITED, Shenzhen (CN)

(72) Inventor: Zhonghua Yu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 292 days.

(21) Appl. No.: 17/739,399

(22) Filed: May 9, 2022

(65) Prior Publication Data

US 2022/0258048 A1    Aug. 18, 2022

Related U.S. Application Data

(63) Continuation of application No. PCT/CN2021/125589, filed on Oct. 22, 2021.

(30) Foreign Application Priority Data

Nov. 27, 2020    (CN) .......................... 202011360571.8

(51) Int. Cl.
   *A63F 13/52*    (2014.01)
   *A63F 13/60*    (2014.01)
   (Continued)

(52) U.S. Cl.
   CPC .............. *A63F 13/52* (2014.09); *A63F 13/60* (2014.09); *G06T 13/40* (2013.01); *G06T 13/80* (2013.01);
   (Continued)

(58) Field of Classification Search
   CPC ................................ A63F 13/48; A63F 13/88
   See application file for complete search history.

(56) References Cited

U.S. PATENT DOCUMENTS

| 11,014,006 B1* | 5/2021 | Farrell, Jr. ............. A63F 13/323 |
| 2006/0287106 A1* | 12/2006 | Jensen .................. A63F 13/795 |
| | | 463/42 |

(Continued)

FOREIGN PATENT DOCUMENTS

| CN | 1897003 A | 1/2007 |
| CN | 105653833 A | 6/2016 |

(Continued)

OTHER PUBLICATIONS

Japanese Office Action issued Oct. 12, 2023 in corresponding Japanese Patent Application No. 2022-559388 with English translation.

(Continued)

*Primary Examiner* — Chase E Leichliter
(74) *Attorney, Agent, or Firm* — Crowell & Moring LLP

(57) ABSTRACT

The present disclosure is directed to a method and apparatus for executing an interaction event. The method may include displaying a picture of a preparatory stage prior to start of an interaction process in a virtual scene. A first group of avatars may be engaging in the interaction process, and the interaction process may include one or more interaction events. The method may further include determining a target avatar in the first group of avatars based on attribute information of the first group of avatars. The target interaction event may be an interaction event that allows to be jointly executed by the first group of avatars. The method may further include, in response to the target avatar triggering the target interaction event in the preparatory stage, displaying a picture of a second group of avatars executing the target interaction event.

20 Claims, 9 Drawing Sheets

(51) Int. Cl.
*G06T 13/40* (2011.01)
*G06T 13/80* (2011.01)
*A63F 13/837* (2014.01)
*G06F 3/0488* (2022.01)

(52) U.S. Cl.
CPC ..... *A63F 13/837* (2014.09); *A63F 2300/6607* (2013.01); *A63F 2300/8076* (2013.01); *G06F 3/0488* (2013.01); *G06T 2200/24* (2013.01)

(56) References Cited

U.S. PATENT DOCUMENTS

| | | | | |
|---|---|---|---|---|
| 2008/0318687 | A1* | 12/2008 | Backer | A63F 13/49 463/43 |
| 2009/0124349 | A1* | 5/2009 | Dawson | A63F 13/12 463/24 |
| 2009/0280909 | A1* | 11/2009 | McEniry | A63F 13/30 463/42 |
| 2011/0201430 | A1* | 8/2011 | Maribona | G07F 17/32 463/42 |
| 2013/0031475 | A1* | 1/2013 | Maor | A63F 13/533 715/706 |
| 2014/0274377 | A1* | 9/2014 | Morel | A63F 13/48 463/31 |
| 2018/0104585 | A1* | 4/2018 | Dawson | A63F 13/88 |
| 2018/0126275 | A1* | 5/2018 | Sherr | G06T 13/40 |
| 2018/0133595 | A1* | 5/2018 | Miller | A63F 13/795 |
| 2018/0169528 | A1* | 6/2018 | Hinoshita | A63F 13/795 |
| 2019/0111343 | A1* | 4/2019 | Payzer | A63F 13/25 |
| 2019/0388792 | A1* | 12/2019 | Goslin | A63F 13/537 |
| 2020/0016495 | A1* | 1/2020 | Cruz | A63F 13/355 |
| 2021/0346803 | A1* | 11/2021 | Gillberg | A63F 13/67 |
| 2022/0258048 | A1* | 8/2022 | Yu | A63F 13/88 |

FOREIGN PATENT DOCUMENTS

| | | |
|---|---|---|
| CN | 105653838 A | 6/2016 |
| CN | 108465238 A | 8/2018 |
| CN | 109364489 A | 2/2019 |
| CN | 109876440 A | 6/2019 |
| CN | 110124310 A | 8/2019 |
| CN | 112370778 A | 2/2021 |
| KR | 10-2014-0085621 A | 7/2014 |
| WO | WO2022/111164 A1 | 6/2022 |

OTHER PUBLICATIONS

[Toshiji] who can be considered to be an appeal of New, which can be considered to be an attractive claim [Jan. 5-6, 2005], [search] on Oct. 6, 2023, https://chara.ge/fortnite/fortnite, and online], 2021—good-friend—newemote—in/, esgecially refer to the text in the text. Method for installing and introducing a 'Toshiji' formal version (Android ios) [search on Oct. 10, 2023], https://gamewith.jp/fortnite/article/show/119927, especially the text, see the text, see the text) [Jan. 19, 2006, Fortnite], GameWith[online], 2020].

International Search Report regarding PCT/CN2021/125589 dated Jan. 17, 2022.

Chinese Office Action with English concise explanation regarding 202011360571.8 dated Dec. 30, 2021.

"Dream Love Dance dances with friends, friends invite to join the game," Raiders Cheats, May 3, 2017, 2 pages.

"Harry Potter: Magic Awakening" Ball System, Dec. 23, 2019, 2 pages.

"QQ speed dance mode," Oct. 23, 2020, 2 pages.

"How to lead the dance at the beginning of QQ Speed," Feb. 15, 2020, 2 pages.

Office Action issued on Taiwan application No. TP212016-TW on Dec. 20, 2022, 10 pages, in Taiwanese language.

English language translation of Office Action issued on Taiwan application No. TP212016-TW on Dec. 20, 2022, 5 pages.

Indonesian Office Action with Machine Translation, dated Jan. 31, 2024, pp. 4, issued in Indonesia Patent Application No. P00202206932, Ministry of Law and Human Rights Republic of Indonesia Directorate General of Intellectual Property, South Jakarta, Indonesia.

Canadian Office Action issued Jul. 28, 2023 in corresponding Canadian Patent Application No. 3,161,927.

Office Action with Machine Translation, dated Feb. 27, 2024, pp. 1-24, issued in Chinese Application No. 110141923, Intellectual Property Bureau of the Ministry of Economic Affairs, Taipei City, Taiwan.

Australian Office Action dated Apr. 5, 2024, pp. 6, issued in Australian Patent Application No. 2021389792.

Australian Office Action issued Jun. 13, 2023 in corresponding Australian Patent Application No. 2021389792.

Australian Office Action, dated Dec. 14, 2023, pp. 1-3, issued in Australian Patent Application No. 2021389792, IP Australia, Phillip Act.

USK Gaming, "How to Dance in Main Lobby in Fortnite Battle Royale! Dance with Friends in Lobby (Fortnite)" retrieved from <https://www.youtube.com/watch?v=o7Bq21iKzVM&ab_channel=USKGaming>, dated Feb. 26, 2018, 1 pg.

Black Soft Cow, "Fortnite's New Skin Snug Emote and Gameplay Review," retrieved from <https://youtu.be/YhQmK99qYZc?si=cWx501hOcV7Nc025>, dated Oct. 19, 2019. 1 pg.

Trimix, "These Fortnite Emotes Should Be Synched Emotes," retrieved from <https://www.youtube.com/watch?v=WYUnzNR5nYc&ab_channel=Trimix>, 1 pg.

Office action in Korean application No. 10-2022-7018838, dated Jun. 7, 2024, 35 pages (with English translation).

Search report issued in United Arab Emirates application No. P6001312/2022, dated Oct. 16, 2024, 3 pages.

Office action issued in United Arab Emirates application No. P6001312/2022, dated Oct. 16, 2024, 6 pages.

Office action in Vietnamese application No. 1-2022-03951, dated Jun. 25, 2024, 3 pages (with English translation).

Office action issued in Brazilian application No. BR112022012209-8, dated Aug. 15, 2024, 7 pages (with English translation).

* cited by examiner

METHOD AND APPARATUS FOR EXECUTING INTERACTION EVENT

RELATED APPLICATION

This application is a continuation application of PCT Patent Application No. PCT/CN2021/125589, filed on Oct. 22, 2021, which claims priority to Chinese Patent Application No. 202011360571.8, entitled "METHOD AND APPARATUS FOR EXECUTING INTERACTION EVENT, ELECTRONIC DEVICE, COMPUTER-READABLE STORAGE MEDIUM, AND COMPUTER PROGRAM PRODUCT", filed with the China Intellectual Property Administration on Nov. 27, 2020, wherein the content of each of the above-referenced applications is incorporated herein by reference in its entirety.

FIELD OF THE TECHNOLOGY

This application relates to the field of computers, and in particular, to a method and apparatus for executing an interaction event, an electronic device, a computer-readable storage medium, and a computer program product.

BACKGROUND OF THE DISCLOSURE

A user can control movement of an avatar or perform some simple movements in a preparatory stage before due start of an interaction process in a virtual scene. However, the following problem exists in the related art: users are unable to control interaction between avatars before start of the interaction process just like what they do after the interaction process begins. Consequently, the users lack necessary understanding of the interaction form in the virtual scene, and have to learn gradually after the interaction process starts. The learning is costly, and affects human-computer interaction efficiency in the virtual scene, especially when a large number of virtual scenes are optional.

In the related art, there is no effective solution to the problem of not supporting character interaction before the start of the interaction process in the virtual scene.

SUMMARY

An embodiment of this disclosure provides a method and apparatus for executing an interaction event, an electronic device, a computer-readable storage medium, and a computer program product to enable a user to, before a virtual scene duly runs, control an avatar to perform human-computer interaction and inter-avatar interaction, thereby providing an approach to efficiently understanding and learning interaction skills.

According to an aspect of embodiments of this disclosure, a method for executing an interaction event is provided. The method is performed by an electronic device. The method may include displaying a picture of a preparatory stage prior to start of an interaction process in a virtual scene. A first group of avatars may be engaging in the interaction process, and the interaction process may include one or more interaction events. The method may further include determining a target avatar in the first group of avatars based on attribute information of the first group of avatars. The target avatar may be able to trigger a target interaction event in the preparatory stage, and the target interaction event may be an interaction event that, among the one or more interaction events, allows to be jointly executed by the first group of avatars. The method may further include, in response to the target avatar triggering the target interaction event in the preparatory stage, displaying, in the virtual scene, a picture of a second group of avatars executing the target interaction event. The second group of avatars may include an avatar who executes the target interaction event in the first group of avatars.

According to another aspect of embodiments of this disclosure, an apparatus for executing an interaction event is further provided. The apparatus may include a memory operable to store computer-readable instructions and a processor circuitry operable to read the computer-readable instructions. When executing the computer-readable instructions, the processor circuitry may be configured to display a picture of a preparatory stage prior to start of an interaction process in a virtual scene. A first group of avatars may be engaging in the interaction process, and the interaction process may include one or more interaction events. The processor circuitry may be configured to determine a target avatar in the first group of avatars based on attribute information of the first group of avatars. The target avatar may be able to trigger a target interaction event in the preparatory stage, and the target interaction event may be an interaction event that, among the one or more interaction events, allows to be jointly executed by the first group of avatars. The processor circuitry may be configured to, in response to the target avatar triggering the target interaction event in the preparatory stage, display, in the virtual scene, a picture of a second group of avatars executing the target interaction event. The second group of avatars may include an avatar who executes the target interaction event in the first group of avatars.

According to still another aspect of embodiments of this disclosure, a non-volatile computer-readable media is further provided. The computer-readable media has instructions stored on the machine-readable media. When being executed, the instructions may be configured to cause a machine to display a picture of a preparatory stage prior to start of an interaction process in a virtual scene. A first group of avatars may be engaging in the interaction process, and the interaction process may include one or more interaction events. The instructions may be configured to cause the machine to determine a target avatar in the first group of avatars based on attribute information of the first group of avatars. The target avatar may be able to trigger a target interaction event in the preparatory stage, and the target interaction event may be an interaction event that, among the one or more interaction events, allows to be jointly executed by the first group of avatars. The instructions may be configured to cause the machine to, in response to the target avatar triggering the target interaction event in the preparatory stage, display, in the virtual scene, a picture of a second group of avatars executing the target interaction event. The second group of avatars may include an avatar who executes the target interaction event in the first group of avatars.

According to still another aspect of embodiments of this disclosure, an electronic device is further provided. The electronic device includes a memory and a processor. The memory stores a computer program. The processor is configured to perform the method for executing an interaction event by means of the computer program.

According to still another aspect of embodiments of this disclosure, a computer program product is further provided, including a computer program or instruction. When executed by a processor, the computer program or instruction implements the foregoing method for executing an interaction event.

In the embodiments of this disclosure, the picture of the preparatory stage prior to start of the interaction process is displayed in the virtual scene. The avatars engaged in the interaction process include a first group of avatars. The target avatar is determined in the first group of avatars based on the attribute information of the first group of avatars. The target avatar is set as allowed to trigger the target interaction event in the preparatory stage. The target interaction event is an interaction event that allows to be jointly executed by the first group of avatars. When the target avatar triggers the target interaction event in the preparatory stage, the picture of the second group of avatars executing the target interaction event is displayed in the virtual scene. The second group of avatars includes an avatar who executes the target interaction event in the first group of avatars. In this way, avatar interaction prior to start of the virtual scene is implemented. A user is enabled to control the avatar to perform human-computer interaction and inter-avatar interaction before the virtual scene duly runs. Therefore, an efficient approach to understanding and learning interactive skills is provided, thereby enriching both human-computer interaction modes and inter-user interaction modes on the basis of enhancing fun of the virtual scene.

BRIEF DESCRIPTION OF THE DRAWINGS

The drawings described herein are intended to enable a further understanding of this disclosure, and constitute a part of this disclosure. The exemplary embodiments of this disclosure and the description thereof are intended to explain this disclosure but not to constitute any undue limitation on this disclosure. In the drawings.

DESCRIPTION OF EMBODIMENTS

To enable a person skilled in the art to understand the solutions in this disclosure more clearly, the following clearly and fully describes the technical solutions in the embodiments of this disclosure with reference to the drawings hereof. Apparently, the described embodiments are merely a part of but not all of the embodiments of this disclosure. All other embodiments derived by a person of ordinary skill in the art based on the embodiments of the present invention without making any creative effort fall within the protection scope of the present invention.

The terms such as "first" and "second" in the specification, claims, and drawings of this disclosure are intended to distinguish between similar items, but not to indicate a specific order or sequence. Understandably, such terms may be interchanged under appropriate circumstances, so that the embodiments of this disclosure described herein can be implemented in order or sequence other than what is illustrated or described herein. Further, the terms "include", "comprise", "possess", and any variations thereof, are intended to cover non-exclusive inclusion. For example, a process, method, system, product, or device that includes or comprises a series of steps or units is not necessarily limited to the expressly enumerated steps or units, but may include other steps or units that are not expressly enumerated or that are inherent to the process, method, product, or device.

A virtual scene is a scene that is outputted on a device as different from the real world. Visual perception of the virtual scene can be formed by naked eyes or under assistance of a device. For example, a two-dimensional image is outputted by a display screen, and a three-dimensional image is outputted through three-dimensional display technologies such as three-dimensional projection, virtual reality, and augmented reality. In addition, various perceptions arising from simulation of the real world, such as auditory perception, tactile perception, olfactory perception, and motion perception, can also be formed through different types of possible hardware. The virtual scene includes a battle scene, a game battle scene, and the like that are outputted by military simulation software, as detailed below using an example in which the virtual scene is a gaming scene.

Terms used in this disclosure are interpreted below. Heat score means a score accrued from purchase of corresponding items at the cost of virtual token coins in a game. Heat level means a hierarchical level determined based on the heat score. Heat ranking means rankings of heat levels. An avatar portrait booth of top N users is established in a birth island prior to start of the game. The booth exhibits the portraits of the top N users before start of a round of game. The avatar portraits of the top N users are exhibited to all users engaged in the round of game, where N is a natural number, and the value of N can be set arbitrarily.

Figure 3:
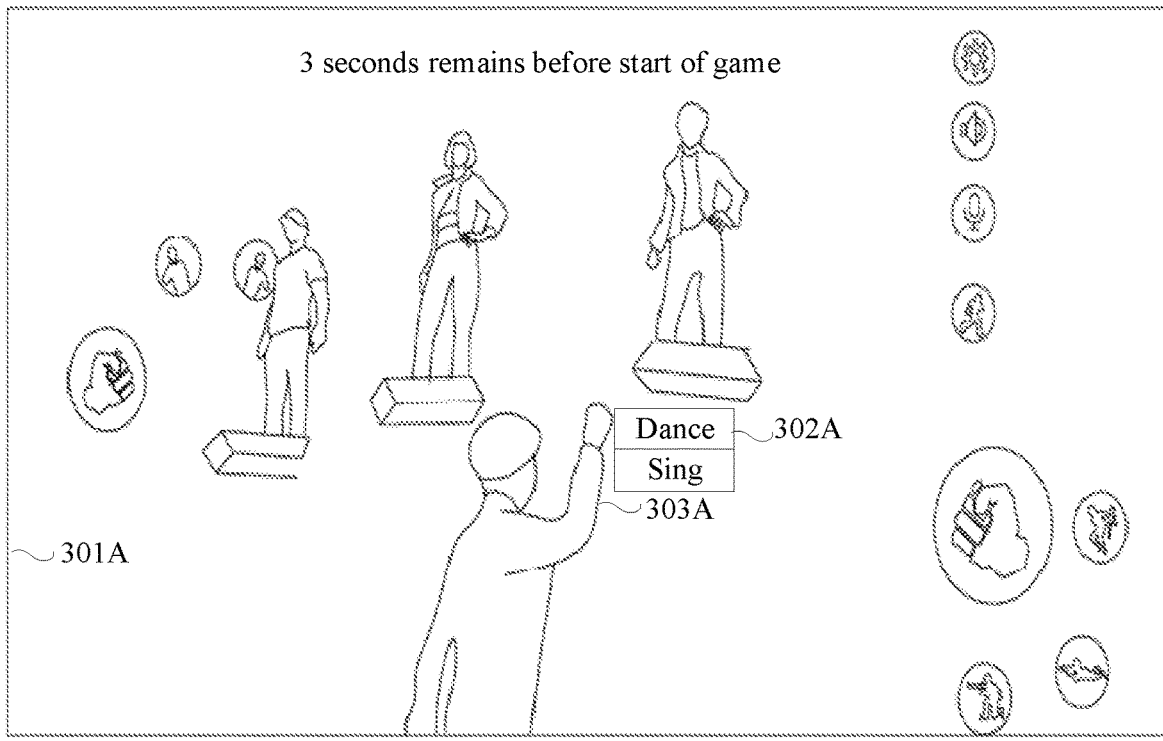
FIG. 3 is a schematic diagram of a picture of a preparatory stage in a game application according to an embodiment of this disclosure.

In the related art, a target game application may be a mobile game installed on a mobile terminal, or an online game on a computer. Before starting a round of game, the user usually enters a preparatory stage. A graphical user interaction interface of the preparatory stage is displayed in the target game application in the preparatory stage. For example, FIG. 3 is a schematic diagram of a picture of a preparatory stage in a game application according to an embodiment of this disclosure. The game scene shown in FIG. 3 may be a game hall. A virtual avatar engaged in a ground of game enters the game hall to wait for start of the game. A movement control 302 is displayed in the graphical user interaction interface 301. In response to a trigger operation pertinent to the movement control 302, the user may control, in this game scene, an avatar 303 to perform movements corresponding to the movement control 302, such as moving, jumping, posing a victory gesture, and the like. However, if the user is able to control just his own avatar to perform such simple movements, but unable to control other avatars to interact with an avatar controlled by the user, the fun of game interaction is lacking. The graphical user interaction interface may only display the avatars of top-ranking users. When evaluating users' dress-up score, only the avatars of the top-ranking users are exhibited in preparatory stage of the game. The avatars of a plurality of users are unable to be exhibited simultaneously. During the exhibition, the interaction efficiency is low, and the utilization rate of display resources is low.

In view of the technical problems in the related art such as lack of avatar interaction in the preparatory stage of the game and monotone effects of displaying the avatars, an embodiment of this disclosure provides a method and apparatus for executing an interaction event, an electronic device, a computer program product, and a computer-readable storage medium, so as to enhance avatar interaction in the preparatory stage of a game, and achieve technical effects of enhancing interaction and fun of the game.

The electronic device configured to implement the method for executing an interaction event according to this embodiment of this disclosure may be implemented in the form of a notebook computer, a tablet computer, a desktop computer, a set-top box, a mobile device (for example, a mobile phone, a portable music player, a personal digital assistant, a special-purpose messaging device, a portable gaming device), and other types of user terminals.

Figure 1:
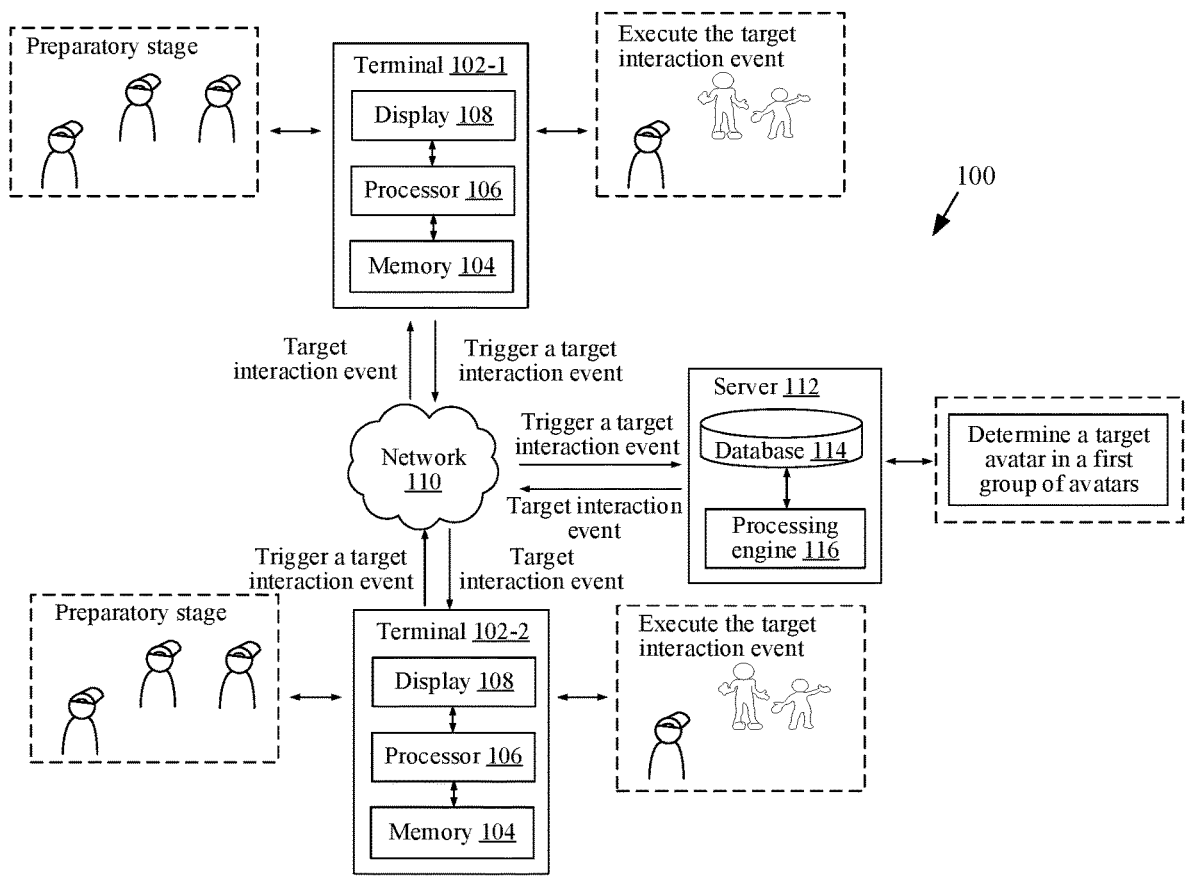
FIG. 1 is a schematic diagram of an application environment of a method for executing an interaction event according to an embodiment of this disclosure.

According to an aspect of embodiments of this disclosure, a method for executing an interaction event is provided. In some embodiments, the method for executing an interaction event is applicable to, but not limited to, an application environment 100 shown in FIG. 1. The following describes the method using an example in which the virtual scene is a gaming scene. FIG. 1 is a schematic diagram of an application environment 100 of a method for executing an interaction event according to an embodiment of this disclosure. The application environment 100 may include: a terminal 102-1, a terminal 102-2, a network 110, and a server 112.

FIG. 1 is a schematic diagram of an architecture of a system for executing an interaction event according to an embodiment of this disclosure. To support a social application, the terminal 102-1 and the terminal 102-2 are connected to the server 112 through a network 110. The network 110 may be a wide area network, a local area network, or a combination thereof.

A picture of a preparatory stage prior to start of an interaction process in a virtual scene is displayed in a target game application of the terminal 102-1 and the terminal 102-2. The server 112 determines a target avatar in a first group of avatars. The target avatar is set as allowed to trigger a target interaction event in the preparatory stage. The target interaction event is an interaction event that allows to be jointly executed by the first group of avatars. When a user who controls the target avatar uses the terminal 102-1, the target avatar in the terminal 102-1 triggers a target interaction event in the preparatory stage. In response to the triggering, the server 112 sends display data to the terminal 102-1 and the terminal 102-2, where the display data corresponds to the execution of the target interaction event. A picture of a second group of avatars executing the interaction event is displayed in the target game application of the terminal 102-1 and the terminal 102-2. In this way, the user of the terminal 102-2 controls the second group of avatars. The second group of avatars include an avatar who executes the target interaction event in the first group of avatars.

In some embodiments, the terminal or server may implement, by running a computer program, the method for executing an interaction event according to this embodiment of this disclosure. For example, a computer program may be a native program or a software module in an operating system. The computer program may be a local application (APP), that is, a program that needs to be installed in the operating system before the program can run, or an instant messaging APP. Alternatively, the computer program may be an applet, that is, a program that can be run by just being downloaded into a browser environment; Alternatively, the computer program may be an applet that can be embedded in any APP. To sum up, the computer program may be any form of application, module or plug-in.

This embodiment of this disclosure may be implemented by virtue of cloud technology. Cloud technology is a hosting technology that unifies a series of resources such as hardware, software, and network in a wide area network or a local area network to implement data computing, storing, processing, and sharing.

Cloud technology is a generic term of network technology, information technology, integration technology, management platform technology, and application technology that are applied based on a cloud computing business model. Cloud computing technology becomes an important support. Backend services of a technical network system involve a large amount of computing and storage resources.

In some embodiments, the electronic device may be a terminal device, and may include but is not limited to at least one of: a mobile phone (such as an Android phone or an iOS phone), a notebook computer, a tablet computer, a handheld computer, a mobile Internet device (MID), a Pad, a desktop computer, a smart television, or the like. The electronic device may be configured with a target client. The target client may be a gaming client, an instant messaging client, a browser client, a video client, a shopping client, or the like. In this embodiment, the electronic device may be, but is not limited to: a memory 104, a processor 106, or a display 108. The memory 104 may be configured to store data, for example, store attribute information of the avatar. The processor may be configured to determine a target avatar in the first group of avatars. The display 108 may be configured to display a graphical user interaction interface, for example, display a picture of the preparatory stage prior to start of a round of game, and display a picture of the second group of avatars executing the target interaction event.

In some embodiments, the network 110 may include, but is not limited to, a wired network and a wireless network. The wired network includes a local area network, a metropolitan area network, and a wide area network. The wireless network includes Bluetooth, WiFi, and other networks that implement wireless communication.

In some embodiments, the server 112 may be a standalone physical server, or may be a server cluster or distributed system formed by a plurality of physical servers, or may be a cloud server that provides basic cloud computing services such as a cloud service, a cloud database, cloud computing, a cloud function, cloud storage, a network service, cloud communications, a middleware service, a domain name service, a security service, a content delivery network (CDN), and a big data and artificial intelligence platform. The terminal 102 may be, but is not limited to, a smartphone, a tablet computer, a notebook computer, a desktop computer, a smart speaker, a smart watch, or the like. The terminal 102-1, the terminal 102-2, and the server 112 may be directly or indirectly connected through wired or wireless communication, without being limited herein. The server 112 may include, but is not limited to, a database 114 and a processing engine 116. The database 114 may be configured to store data, for example, store attribute information of the avatar. The processing engine may be configured to determine a target avatar in the first group of avatars. The above is merely an example, and constitutes no limitation on this embodiment.

Figure 2:
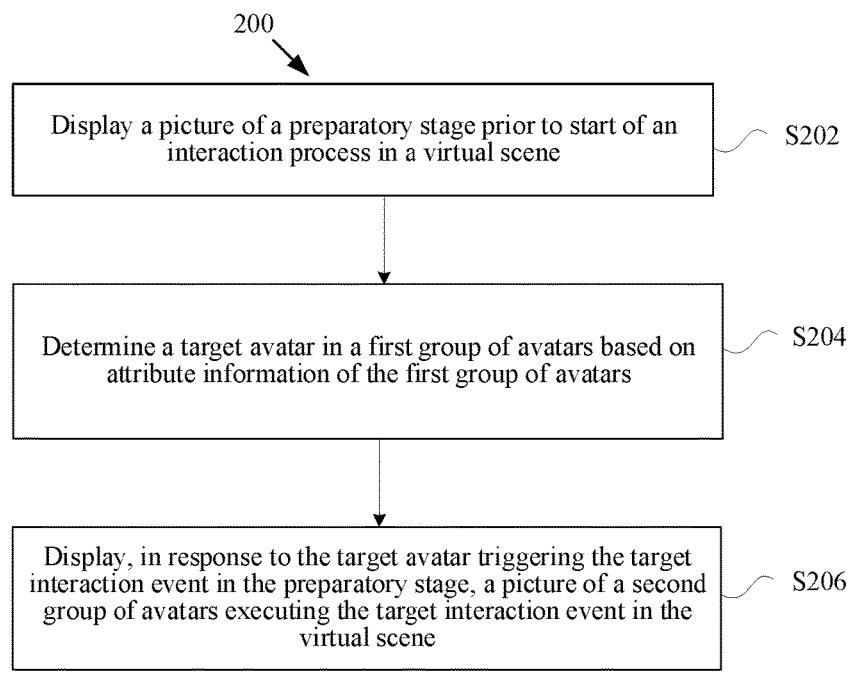
FIG. 2 is a flowchart of a method for executing an interaction event according to an embodiment of this disclosure.

In some embodiments, as shown in FIG. 2, the method 200 for executing an interaction event includes steps S202 to S206.

Step S202: Display a picture of a preparatory stage prior to start of an interaction process in a virtual scene. Avatars engaged in the interaction process include a first group of avatars, and the interaction process includes one or more interaction events.

In an example, when the virtual scene is a target game application, the interaction process is a battle process subsequent to start of the target game application, or a cooperation process subsequent to start of the target game application, or the like. In other words, the interaction process indicates that the target game application has started. In addition, a plurality of interaction events, such as an attack event and a defense event, occur in an interaction process subsequent to the start of the target game application. The interaction process in step S202 occurs after the preparatory stage. The target interaction event in step S204 is triggered in the preparatory stage prior to the start of the target game application. In the related art, inter-avatar interaction does not occur until the preparatory stage ends. In this embodiment of this disclosure, an interaction function is available in the preparatory stage. In this way, a user is enabled to control the avatar to perform human-computer interaction and inter-avatar interaction before the virtual scene duly runs. Therefore, an efficient approach to understanding and learning interactive skills is provided, thereby enriching both human-computer interaction modes and inter-user interaction modes on the basis of enhancing fun of the virtual scene.

To be specific, a picture of the preparatory stage of a round of game prior to start of the game is displayed in the target game application. The avatars engaged in the round of game include a first group of avatars.

In an example, the first group of avatars includes at least two avatars. Assuming that the first group of avatars includes two avatars, an avatar A is controlled by a user who uses the terminal 102-1, and an avatar B is controlled by a user who uses the terminal 102-2. The picture of the preparatory stage prior to start of a round of game is displayed in the target game application of the terminal 102-1 and the terminal 102-2.

Step S204: Determine a target avatar in the first group of avatars based on attribute information of the first group of avatars. The target avatar is set as allowed to trigger a target interaction event in the preparatory stage. The target interaction event is an interaction event that, among the one or more interaction events, allows to be jointly executed by the first group of avatars.

Figure 5A:
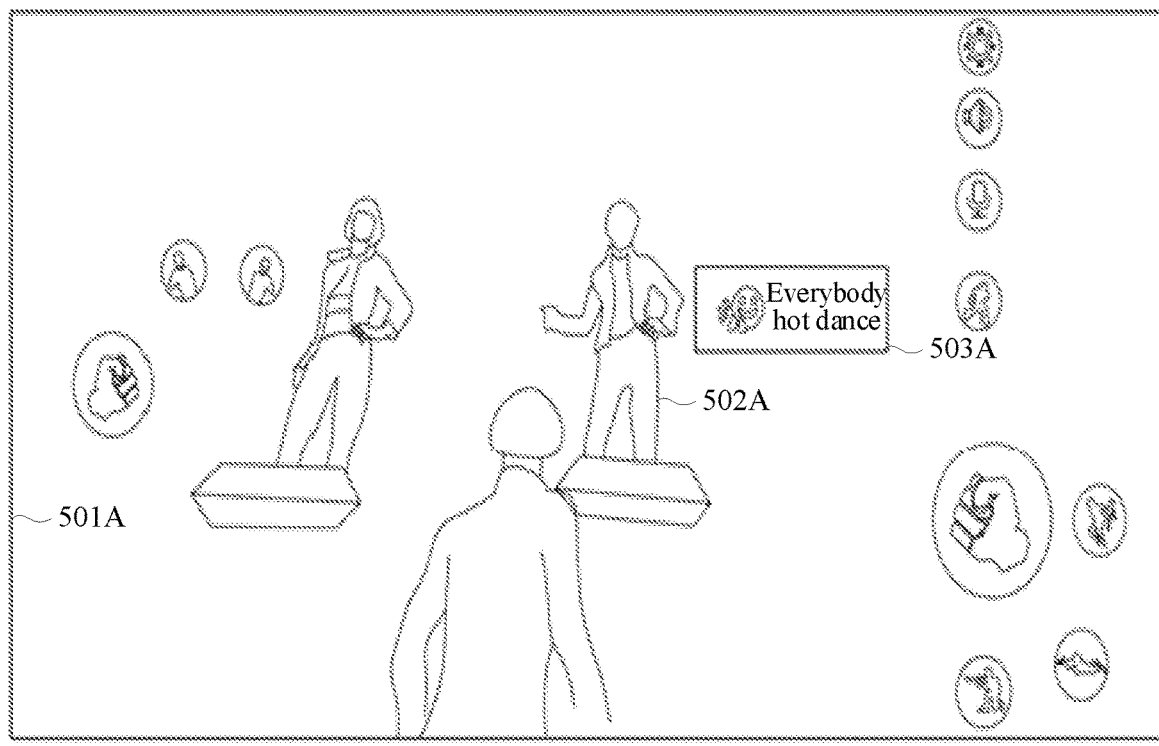
FIGS. 5A-5B are schematic diagrams of a first interactive object according to an embodiment of this disclosure.

In an example, the determining the target avatar in step S204 may be implemented by a terminal, or by a server. If the user who controls the target avatar uses the terminal 102-1, when the target avatar is set as allowed to trigger a target interaction event in the preparatory stage, a first interactive object corresponding to the target avatar can be displayed in the terminal 102-1. The first interactive object is a control or a button. The first interactive object is perceivable by only the user who controls the target avatar. FIG. 5A is a schematic diagram of a first interactive object according to an embodiment of this disclosure. The graphical user interaction interface 501A displays the target avatar 502A and the first interactive object 503A corresponding to the target avatar 502A, and triggers the target interaction event in response to a trigger operation performed by the target avatar 502A on the first interactive object 503A.

Figure 5B:
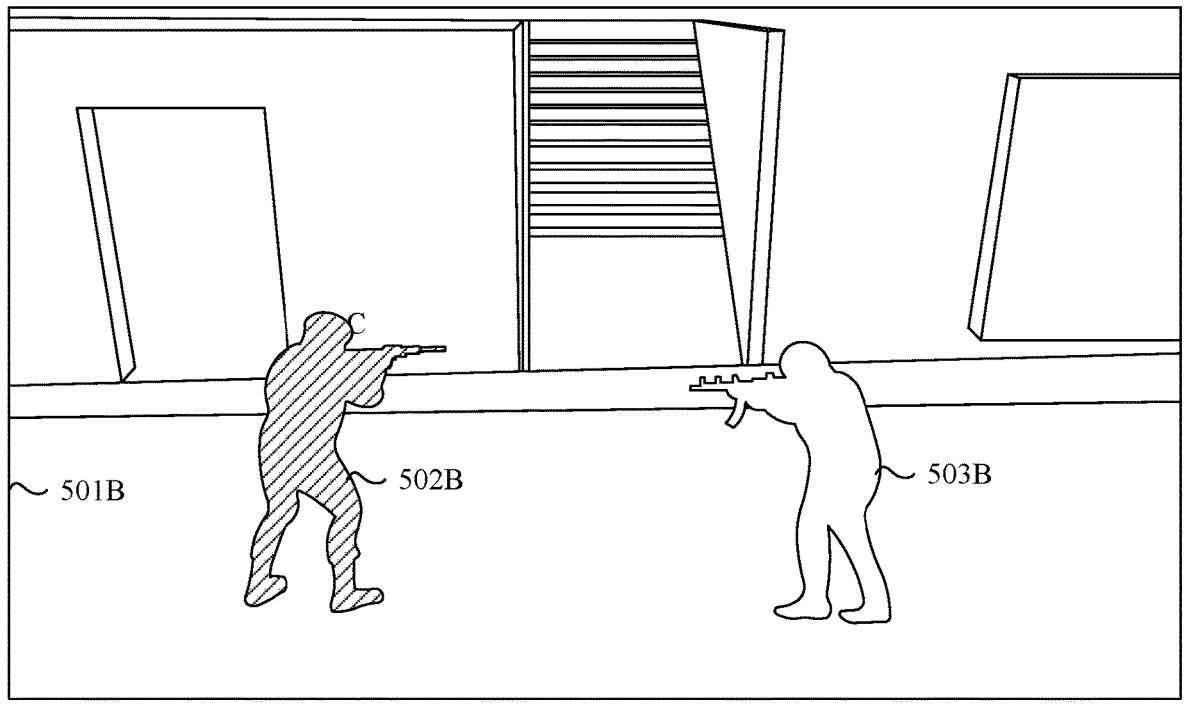

In an example, when the target avatar is set as allowed to trigger the target interaction event in the preparatory stage, the target avatar may be displayed in a target display mode in the terminal 102-1 and the terminal 102-2 that is used by the user who controls other avatars. The target display mode is different from a display mode of other avatars. FIG. 5B is a schematic diagram of a preparatory stage in a game application according to an embodiment of this disclosure. The graphical user interaction interface 501B displays a target avatar 502B and other avatar 503B. The target display mode of the target avatar 502B is different from the display mode of other avatar 503B. When the target avatar is set as allowed to trigger the target interaction event in the preparatory stage, the target avatar can trigger the target interaction event in response to a preset operation such as double-click/tap on the graphical user interaction interface performed by the target avatar 502B on the graphical user interaction interface, without a need to display the first interactive object.

Step S206: Display, in the virtual scene, when the target avatar triggers the target interaction event in the preparatory stage, a picture of a second group of avatars executing the target interaction event.

In the case that the target avatar triggers the target interaction event in the preparatory stage, the picture of the second group of avatars executing the target interaction event is displayed in the target game application. The second group of avatars includes an avatar who executes the target interaction event in the first group of avatars.

In an example, the picture of the second group of avatars executing the target interaction event may be displayed in the terminal 102-1 used by the user who controls the target avatar. Pictures displayed by the terminal 102-1 include the picture of the second group of avatars executing the target interaction event, or, further include a picture of the target avatar itself executing the target interaction event. Further, the picture of the second group of avatars executing the target interaction event may be displayed in the terminal 102-2 used by the user who controls other avatars. Pictures displayed by the terminal 102-2 include the picture of the second group of avatars executing the target interaction event, or further include the picture of the target avatar itself executing the target interaction event.

Through the foregoing steps, avatar interaction prior to start of the virtual scene is implemented. A user is enabled to control the avatar to perform human-computer interaction and inter-avatar interaction before the virtual scene duly runs. Therefore, an efficient approach to understanding and learning interactive skills is implemented, thereby enriching both human-computer interaction modes and inter-user interaction modes on the basis of enhancing fun of the virtual scene.

In an example, after an interaction event is triggered, an avatar who joins the interaction event may execute the interaction event in the game scene. For example, the interaction event may be dancing or singing. In this embodiment, in the preparatory stage of the game, users can jointly perform interaction events to improve interactivity between users and improve the game experience of the users.

In some embodiments, when the target avatar is determined in the first group of avatars, a first interactive object is displayed in a graphical user interaction interface in which the target avatar is locked. The first interactive object is used for triggering the target interaction event.

In an example, the graphical user interaction interface in which the target avatar is locked means that the target avatar is always displayed in the graphical user interaction interface. To be specific, the graphical user interaction interface in which an avatar A is locked means that the avatar A is always displayed in the graphical user interaction interface. Using an example in which the target avatar is locked, the target avatar may be displayed in the graphical user interaction interface from a first-person viewing angle, or the target avatar may be displayed in the graphical user interaction interface from a third-person viewing angle. In parallel with the target avatar that is always displayed, an avatar other than the target avatar may be displayed. In addition, the target avatar is controlled by a user account. The user logs in to the graphical user interaction interface by using the user account. The controlled target avatar is displayed in the graphical user interaction interface to which the user has logged in.

In an example, referring to FIG. 5A, a target avatar 502A and a first interactive object 503A corresponding to the target avatar 502A are displayed in the graphical user interaction interface 501A. The target interaction event is triggered in response to a trigger operation performed by the target avatar 502A on the first interactive object 503A.

Figure 4:
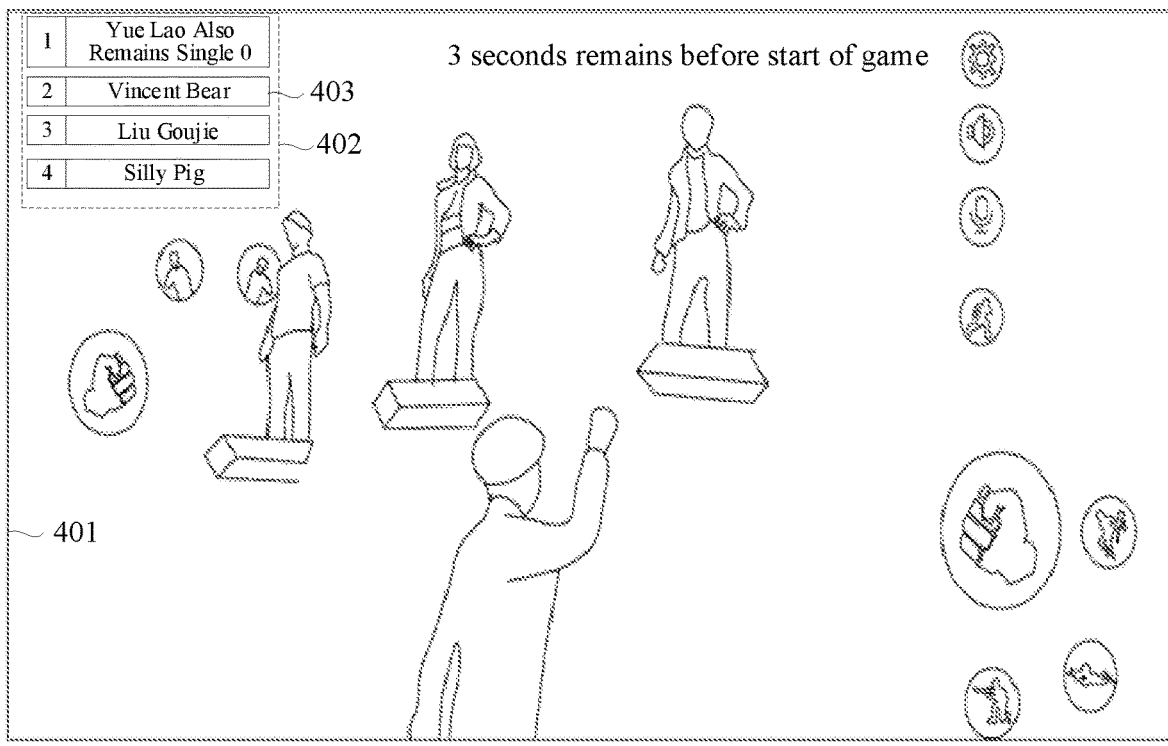
FIG. 4 is a schematic diagram of heat rankings according to an embodiment of this disclosure.

In an example, heat rankings of users engaged in a round of game may be displayed in the graphical user interaction interface of the preparatory stage. Heat scores of top N users may be displayed in a rank list, where N is a natural number. FIG. 4 is a schematic diagram of heat rankings according to an embodiment of this disclosure. A rank list 402 is displayed in the graphical user interaction interface 401. The rank list 402 includes a plurality of game login accounts 403 arranged in sequence. The game login account ranked first 403 possesses the highest heat score. The avatar controlled by the highest-score game login account is displayed at the center of the graphical user interaction interface 401. The game login accounts of the top 4 users with the highest heat score are displayed in the heat rankings of the graphical user interaction interface. As shown in FIG. 4, the account of the user "Yue Lao Also Remains Single 0" possesses the highest heat score in a round of game. In the graphical user interaction interface, the avatar with the highest heat score stands at the center of the graphical user interaction interface, thereby displaying the costumed image of the avatar more effectively.

The costumed image of the game avatar can meet individualization needs of the user. If the costumed image of the avatar is used as a condition for triggering users to jointly execute an interaction event, the user corresponding to the avatar with a top-ranked costumed image controls other avatars to perform an interaction task jointly, thereby enhancing the sense of participation of the users dressed up as avatars, arousing the users' fighting strength, and diversifying human-computer interaction. In this embodiment, the attribute information of the avatar may be the heat score of the avatar, and is used for denoting a score accrued from purchase of corresponding items at the cost of virtual token coins. Generally, the more virtual token coins spent, the higher the heat score. The purchased items may be props used for dressing up as avatars. The target avatar may be an avatar with the highest heat score among all avatars engaged in the round of game. The interaction event is triggered by the target avatar with the highest heat score, thereby enhancing the sense of participation of the users dressed up as avatars, arousing the users' fighting strength, and diversifying the human-computer interaction.

In an example, when the target avatar with the highest heat score is determined, a first interactive object used for triggering an interaction event is displayed in the graphical user interaction interface in which the target avatar is locked. The first interactive object may be a touch button or a rocker button. FIG. 5A is a schematic diagram of a first interactive object according to an embodiment of this disclosure. The graphical user interaction interface shown in FIG. 5A appears in a game played by the target avatar with the highest heat score. The first interactive object 503A is a touch button "Everybody hot dance" in the drawing. By touching the first interactive object 503A, the user who controls the target avatar 502A can trigger an interaction event of hot dancing of the users engaged in a round of game. In this embodiment, the interactive object used for triggering the interaction event is displayed in the graphical user interaction interface in which the target avatar with the highest heat score is locked. The user with the highest heat score controls other users to join the interaction event, thereby enhancing the interactivity of the game, arousing the fighting strength of the game users, and improving the game experience of the user.

In some embodiments, when it is detected that a first touch operation is performed on the first interactive object, a picture is displayed in the graphical user interaction interface in which the target avatar is locked. The picture shows that the target avatar is executing the target interaction event. A second interactive object is displayed in a graphical user interaction interface in which the first avatar is locked. The first avatar is an avatar other than the target avatar in the first group of avatars. The second interactive object is used for executing or shielding execution of the target interaction event based on an indicated operation.

Figure 6:
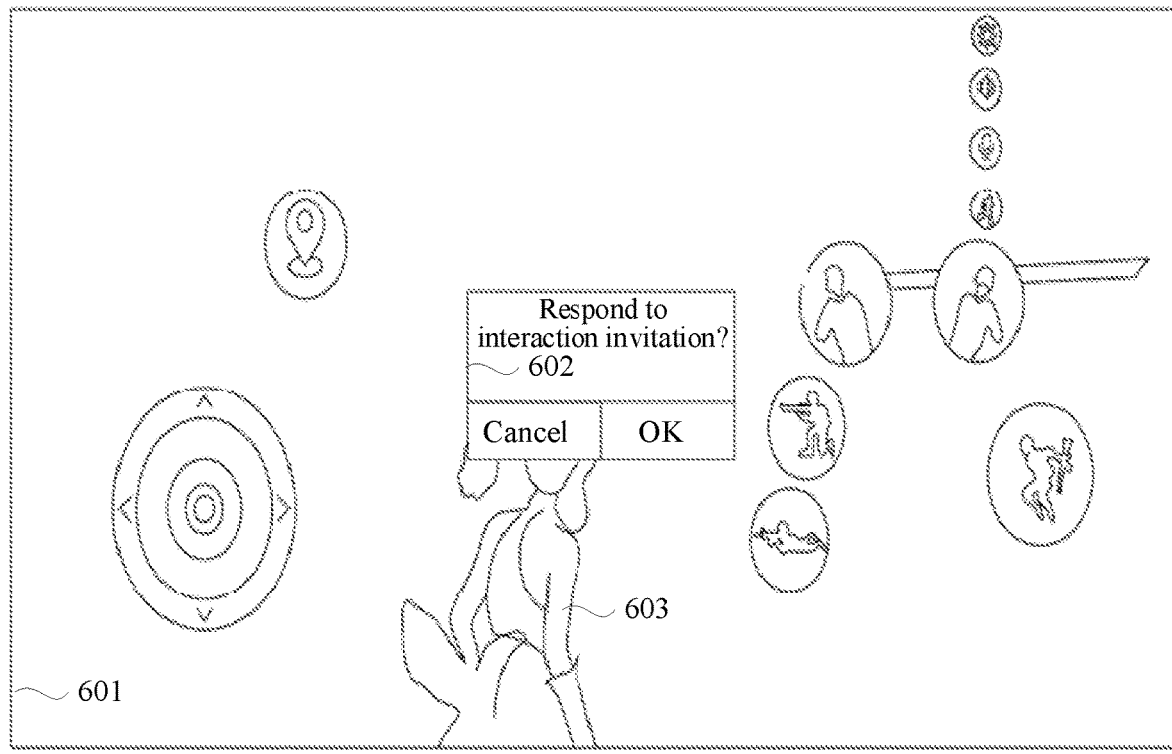
FIG. 6 is a schematic diagram of a second interactive object according to an embodiment of this disclosure.

In an example, after the interaction event is triggered, the target avatar executes the interaction event in the game scene. For example, the interaction event is dancing or singing. A second interactive object is displayed in the graphical user interaction interface in which other avatar is locked. Other avatar is an avatar other than the target avatar among those engaged in a round of game. By touching the second interactive object, other users can choose whether to join the interaction event. FIG. 6 is a schematic diagram of a second interactive object according to an embodiment of this disclosure. The terminal 102-1 is a terminal used by the user who controls the target avatar, and the terminal 102-2 is a terminal used by the user who controls other avatar 603. A second interactive object 602 is displayed in the graphical user interaction interface 601 of the terminal 102-2. The second interactive object 602 may be a prompt message "respond to the interaction invitation or not". The graphical user interaction interface shown in FIG. 6 appears in a game played by other avatar other than the target avatar among the avatars engaged in a round of game. By touching the second interactive object, the user may choose whether to join the interaction event. For example, in the graphical user interaction interface shown in FIG. 6, the user selects "OK" to join the interaction event. The avatar controlled by the user executes the interaction event such as dancing or singing. If the user selects "Cancel", the avatar controlled by the user does not join the interaction event. In this embodiment, the second interactive object is displayed in the graphical user interaction interface of other users, so that other users can choose, as required, whether to join the interaction event, thereby increasing the users' discretion in selection, meeting the needs of different users, and improving the user experience.

In some embodiments, when the target avatar triggers the target interaction event in the preparatory stage, a second interactive object is displayed in a graphical user interaction interface in which the first avatar is locked. The first avatar is an avatar other than the target avatar in the first group of avatars. The second interactive object is used for executing or shielding execution of the target interaction event based on an indicated operation. When it is detected that a second touch operation is performed on a second interactive object, a picture is displayed in the graphical user interaction interface in which the first avatar is locked. The picture shows that the first avatar is executing the target interaction event or showing that the target avatar and the first avatar are jointly executing the target interaction event. The second touch operation is used as an instruction to execute the target interaction event.

Figure 7A:
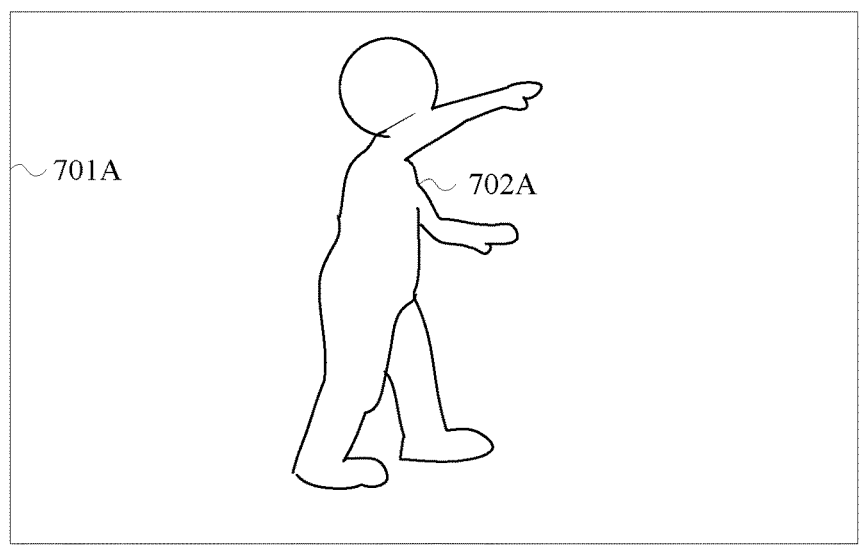
FIGS. 7A-7B are first schematic diagrams of executing a target interaction event according to an embodiment of this disclosure.

In an example, if, in the preparatory stage of the game, an interaction event is triggered by the target avatar with the highest heat score, a second interactive object is displayed in the graphical user interaction interface in which the first avatar is locked. The first avatar is an avatar other than the target avatar among those engaged in a round of game. By using the second interactive object, the users can choose whether to join the interaction event. If the user chooses to join the interaction event, the first avatar controlled by the user will join the interaction event, and the following scene may be displayed in the graphical user interaction interface in which the first avatar is locked:

Scene I: The first avatar alone is executing the interaction event. For example, the first avatar is dancing or singing. FIG. 7A is a first schematic diagram of executing a target interaction event according to an embodiment of this disclosure. The graphical user interaction interface in FIG. 7A is a graphical user interaction interface in which the first avatar is locked. This graphical user interaction interface only displays a picture of the first avatar executing the interaction event. The graphical user interaction interface 701A displays the first avatar 702A. The first avatar 702A is dancing in response to a call from the target avatar. The graphical user interaction interface 701A gives a view from a viewing angle of the first avatar.

Figure 8A:
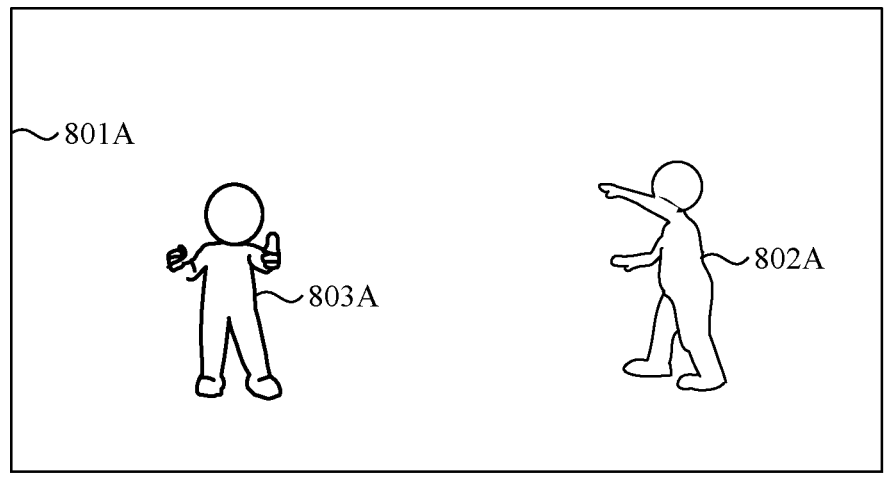
FIGS. 8A-8B are second schematic diagrams of executing a target interaction event according to an embodiment of this disclosure.

Scene II: The first avatar and the target avatar jointly execute an interaction event. For example, the first avatar and the target avatar dance or sing together. FIG. 8A is a second schematic diagram of executing a target interaction event according to an embodiment of this disclosure. The graphical user interaction interface shown in FIG. 8A is a graphical user interaction interface in which the first avatar is locked. This graphical user interaction interface only displays a picture of the first avatar and the target avatar jointly executing the interaction event. The graphical user interaction interface 801A displays the first avatar 802A and the target avatar 803A. The first avatar 802A is dancing together with the target avatar 803A in response to a call from the target avatar 803A.

Figure 9:
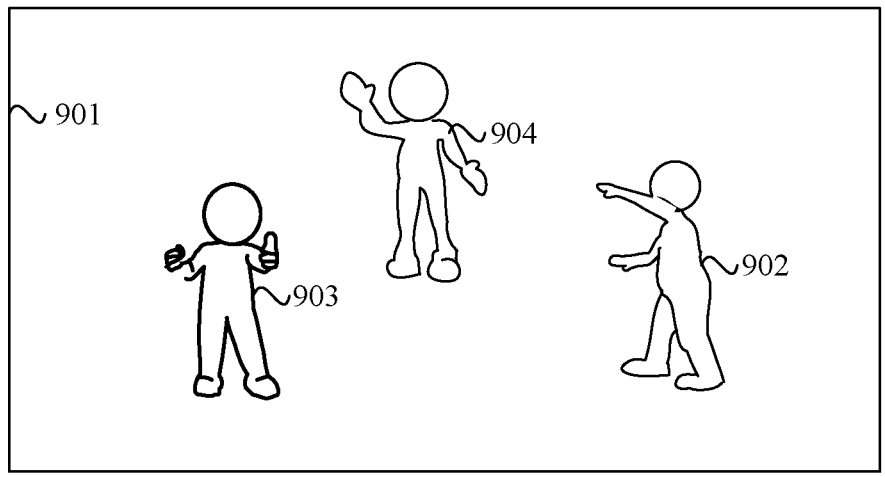
FIG. 9 is a third schematic diagram of executing a target interaction event according to an embodiment of this disclosure.

Scene III: The first avatar, the target avatar, and other avatars who join the interaction event jointly execute the interaction event. The avatars who join the interaction event include not only the first avatar and the target avatar, but also other avatars such as a second avatar. The number of other avatars who join the interaction event may be plural. That is, the number of the second avatar is at least one. The second avatar is an avatar watching the game rather than an avatar engaged in the game. In this way, a user watching the game can also join the interaction event. Alternatively, the second avatar may be a machine-controlled avatar that is configured in the game in different manners. In this embodiment, using an example in which other avatar who joins the interaction event is the second avatar, the first avatar, the target avatar, and the second avatar may dance or sing together. FIG. 9 is a third schematic diagram of executing a target interaction event according to an embodiment of this disclosure. The graphical user interaction interface in FIG. 9 is a graphical user interaction interface 901 in which the first avatar is locked. This graphical user interaction interface displays a picture of the first avatar 902, the target avatar 903, and the second avatar 904 executing the interaction event together.

In an example, the following scenes may be displayed in the graphical user interaction interface in which the target avatar is locked.

Figure 7B:
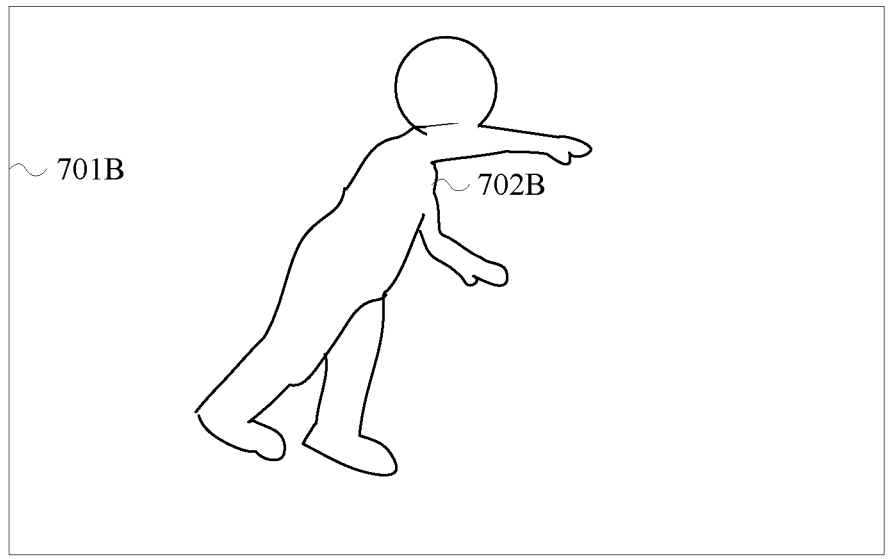

Scene I: The first avatar alone is executing the interaction event. For example, the first avatar is dancing or singing. FIG. 7B is a first schematic diagram of executing a target interaction event according to an embodiment of this disclosure. The graphical user interaction interface in FIG. 7B is a graphical user interaction interface in which the target avatar is locked. This graphical user interaction interface only displays a picture of the first avatar executing the interaction event. The graphical user interaction interface 701B displays the first avatar 702B. The first avatar 702B is dancing in response to a call from the target avatar. The graphical user interaction interface 701B gives a view from a viewing angle of the target avatar.

Figure 8B:
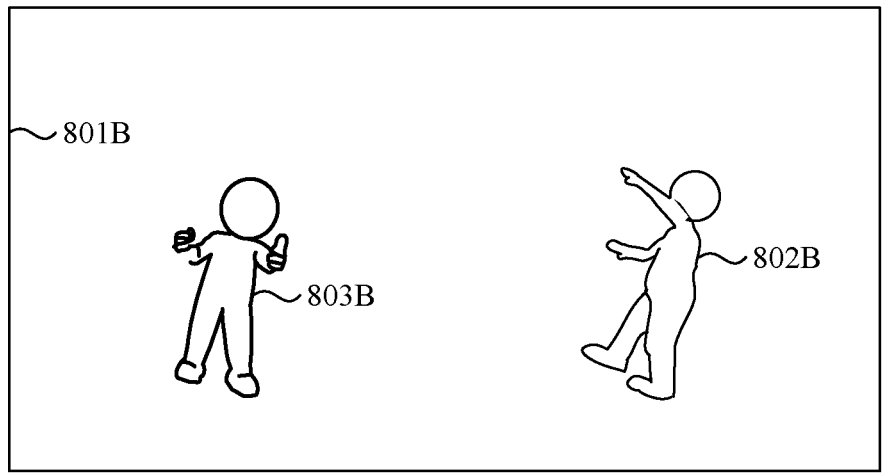

Scene II: The first avatar and the target avatar jointly execute an interaction event. For example, the first avatar and the target avatar dance or sing together. FIG. 8B is a second schematic diagram of executing a target interaction event according to an embodiment of this disclosure. The graphical user interaction interface in FIG. 8B is a graphical user interaction interface in which the target avatar is locked. This graphical user interaction interface only displays a picture of the first avatar and the target avatar jointly executing the interaction event. The graphical user interaction interface 801B displays the first avatar 802B and the target avatar 803B. The first avatar 802B is dancing together with the target avatar 803B in response to a call from the target avatar 803B. The graphical user interaction interface 801B gives a view from a viewing angle of the target avatar.

In an example, the user may discretionarily choose to display, in the graphical user interaction interface, a game scene of executing the target interaction event. For example, the user may choose to display Scene II, or Scene II, or Scene III in the graphical user interaction interface. The picture of the first avatar executing the interaction event is displayed as required by the user, so as to meet requirements of different users and improve the users' game experience.

In some embodiments, After the picture of the preparatory stage prior to start of a round of game is displayed in the target game application, avatar show animations of at least one avatar in the first group of avatars is displayed sequentially in the target game application. When the number of the at least one avatar is one, the at least one avatar is the target avatar. When the number of the at least one avatar is plural, display order of the at least one avatar being determined based on the attribute information of the first group of avatars.

In some embodiments, when the top N avatars are determined in the first group of avatars based on the attribute information of the first group of avatars and that the target avatar is the first one in the top N avatars, avatar show animations of the top N avatars are displayed sequentially in the target game application in order of rankings from a lower ranking to a higher ranking, where N is a natural number.

Figure 10:
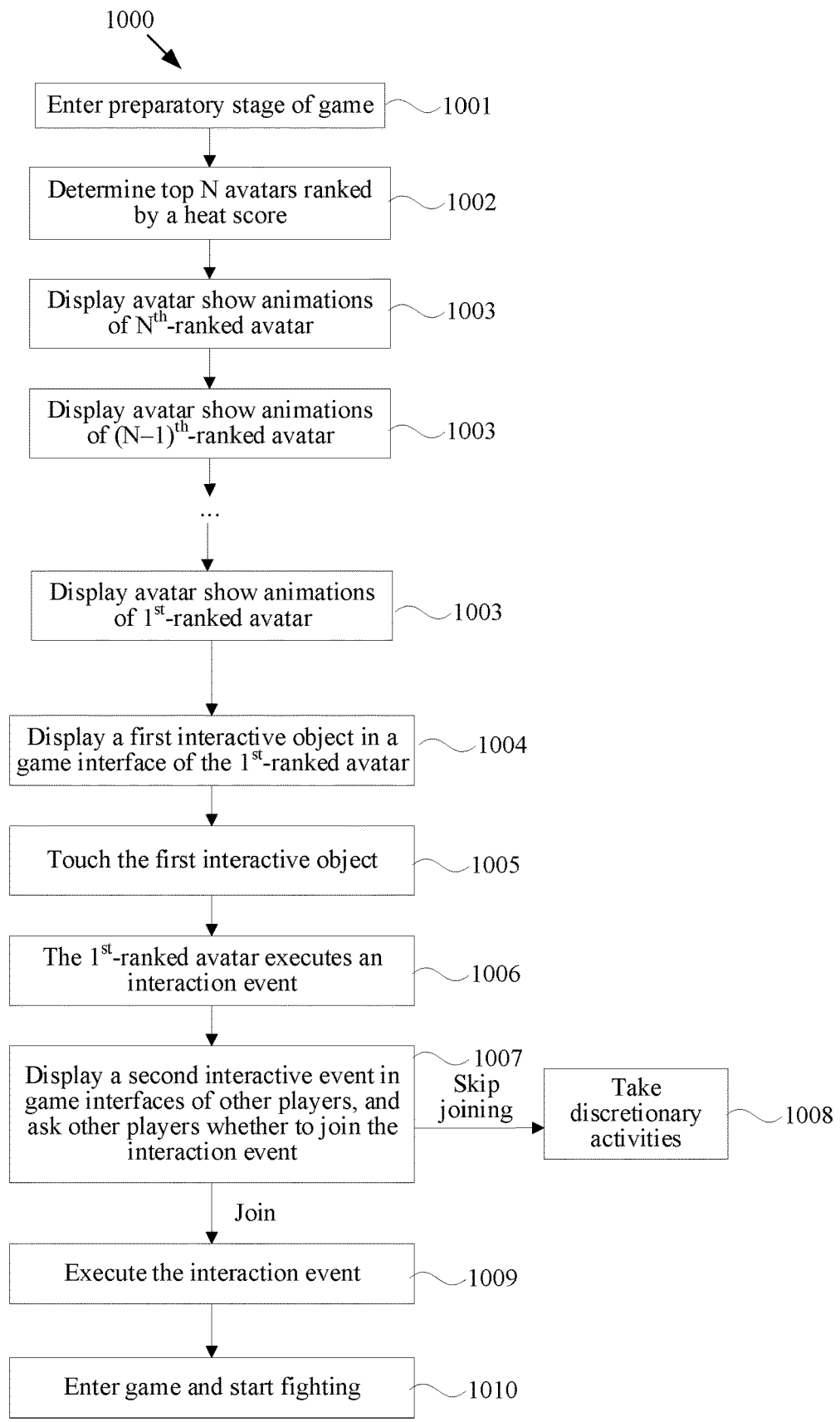
FIG. 10 is a schematic flowchart of avatar show animations of avatars according to an embodiment of this disclosure.

In an example, the top N avatars may be the top N avatars ranked by a heat score, for example, the top 4 avatars in the heat rankings, as shown in FIG. 4. The 4 avatars may be animatedly exhibited in the graphical user interaction interface. The exhibited content may be the dress-up of the avatar or the user information of the avatar. For example, in FIG. 4, the fourth-ranked "Silly Pig" avatar is exhibited first. The avatars are exhibited in the order of rankings from lower ranking to higher ranking until the first-ranked "Yue Lao Also Remains Single 0". Specifically, the avatars may be exhibited in the order of rankings from lower ranking to higher ranking. FIG. 10 is a schematic flowchart of a method 1000 for avatar show animations of avatars according to an embodiment of this disclosure. In step 1001, the preparatory stage of the game begins. In step 1002, the top N avatars by the heat score are determined. In step 1003, the avatar show animations of the top N avatars are displayed sequentially from N to 1. In step 1004, the first interactive object is displayed in the graphical user interaction interface of the first-ranked avatar. In step 1005, the first interactive object is touched. In step 1006, the first-ranked avatar executes an interaction event. In step 1007, the graphical user interaction interface of other user displays the second interactive object, asking the other user whether to join the interaction event. In step 1008, when the other user does not join the interaction event, the avatar of the other user takes discretionary activities. In step 1009, when the other user joins the interaction event, the avatar of the other user executes the interaction event. In step 1010, the target avatar and the first avatar enter the game to start fighting. After the avatar show animations of the avatars are exhibited in the order of heat rankings from lower ranking to higher ranking, the first interactive object is displayed in the graphical user interaction interface in which the first-ranked target avatar is locked, and the user can trigger an interaction event by touching the first interactive object. If the interaction event is triggered, the second interactive object will be displayed in the graphical user interaction interface of other users. By touching the second interactive object, other users can choose whether to join the interaction event. An avatar who joins the interaction event executes the interactive event, such as dancing or singing. An avatar who does not join the interaction event may take discretionary activities, and the user who controls the avatar controls the discretionary activities of the avatar such as walking. Upon completion of executing the interaction event, all avatars who join the game enter the game and start a battle mode. In this embodiment, the avatar show animations are displayed sequentially in the order of ranking, so that the dress-up of the top-ranked avatars is exhibited to improve the game experience of the users.

In some embodiments, when the sequential displaying of the avatar show animations of at least one avatar in the first group of avatars comes to an end, a first interactive object is displayed in a graphical user interaction interface in which the target first avatar is locked. A distance between the first interactive object and the target avatar is less than a distance threshold. The first interactive object is used for triggering the target interaction event.

In some embodiments, when the sequential displaying of the avatar show animations of the top N avatars comes to an end, a first interactive object is displayed in a graphical user interaction interface in which the target avatar is locked. A distance between the first interactive object and the target avatar is less than a distance threshold. The first interactive object is used for triggering the target interaction event.

In an example, when the displaying of the avatar show animations of the top N avatars comes to an end, the first interactive object may be displayed in the graphical user interaction interface in which the first-ranked avatar is locked, asking the user whether to trigger an interaction event. For example, as shown in the flowchart in FIG. 10, after the avatar show animations are exhibited in the order of heat rankings from lower ranking to higher ranking, the first interactive object is displayed in the graphical user interaction interface in which the first-ranked target avatar is locked. The user can trigger an interaction event by touching the first interactive object. If the interaction event is triggered, the second interactive object will be displayed in the graphical user interaction interface of other users. By touching the second interactive object, other users can choose whether to join the interaction event. An avatar who joins the interaction event executes the interactive event, such as dancing or singing. An avatar who does not join the interaction event may take discretionary activities, and the user who controls the avatar controls the discretionary activities of the avatar such as walking. Upon completion of executing the interaction event, all avatars who join the game enter the game and start a battle mode.

In some embodiments, the sequential displaying of the avatar show animations of the top N avatars may be implemented by the following technical solution: displaying the avatar show animations of the top N avatars sequentially on a virtual booth.

In an example, the top N avatar show animations may be exhibited in the order of rankings from lower ranking to higher ranking. For example, the $N^{th}$ avatar show animation is exhibited first, the $(N-1)^{th}$ avatar show animation is exhibited upon completion of exhibiting the $N^{th}$ avatar show animation. Finally, the $1^{st}$ avatar show animation is exhibited. In this embodiment, with the sequential displaying, the top-ranked N avatars can be animatedly displayed, thereby catering for the users' show-off psychology and enhancing the users' game experience.

In some embodiments, the determining a target avatar in the first group of avatars based on attribute information of the first group of avatars includes: determining a target avatar in the first group of avatars based on a heat score of each avatar in the first group of avatars. In the first group of avatars, the target avatar possesses the highest heat score. The heat score of each avatar in the first group of avatars is related to a costume prop obtained by the avatar.

In an example, the heat score means a score accrued from purchase of corresponding items at the cost of virtual token coins in the game. Generally, the more virtual token coins spent, the higher the accrued score, and the higher the heat score. The purchased items may be costume props. The heat score is an accrued value, and may keep accruing all the time, or may be accrued at intervals of time. Upon expiry, the heat score is reset to zero and starts over again. The heat score of each avatar engaged in a round of game is counted. It is determined that the avatar with the highest heat score is the target avatar. The interaction event is triggered by the target avatar. In this embodiment, the interaction event is triggered by the avatar with the highest heat score, thereby catering for the users' show-off psychology, arousing the users' fighting strength, improving the game experience, and enhancing user stickiness.

In some embodiments, a heat score of the first group of avatars is determined based on the costume prop obtained by each avatar in the first group of avatars. The heat score of each avatar is positively correlated to at least one of: the number of costume props obtained by each avatar, the level of the costume prop obtained by each avatar, or a virtual resource cost for obtaining the costume prop by each avatar.

In an example, the heat score may be determined based on the virtual resources spent by each avatar in purchasing props. For example, depending on the accrued value of the virtual resources spent by the avatar in purchasing props in a historical period, the heat score of the avatar is higher if more resources are spent. Alternatively, the heat score may be determined based on the number of virtual props possessed by each avatar. The heat score is higher if the number of virtual props is larger. Alternatively, the heat score may be determined based on the level of the costume prop. The heat score is higher if the level of the costume prop is higher. In this embodiment, the heat score arouses the users' fighting strength, and improves the users' game experience. Virtual resources mean any form of resources that can be transmitted on the network, and are quantitatively measured. For example, a virtual resource may be a gold coin in the game scene, and the quantity of the virtual resources may be the number or amount of gold coins.

In some embodiments, when the target avatar triggers the target interaction event in the preparatory stage, a second interactive object is displayed in a graphical user interaction interface in which the first avatar is locked. The first avatar is an avatar other than the target avatar in the first group of avatars. The second interactive object is used for executing or shielding execution of the target interaction event based on an indicated operation. When it is detected that a third touch operation is performed on the second interactive object, a third interactive object is displayed in the graphical user interaction interface in which the first avatar is locked. The third touch operation is used as an instruction to skip the target interaction event. The third interactive object is used as an instruction to execute the target interaction event. When it is detected that a fourth touch operation is performed on the third interactive object, a picture is displayed in the graphical user interaction interface in which the first avatar is locked. The picture shows that the first avatar is executing the target interaction event or shows that the target avatar and the first avatar are jointly executing the target interaction event.

Figure 11:
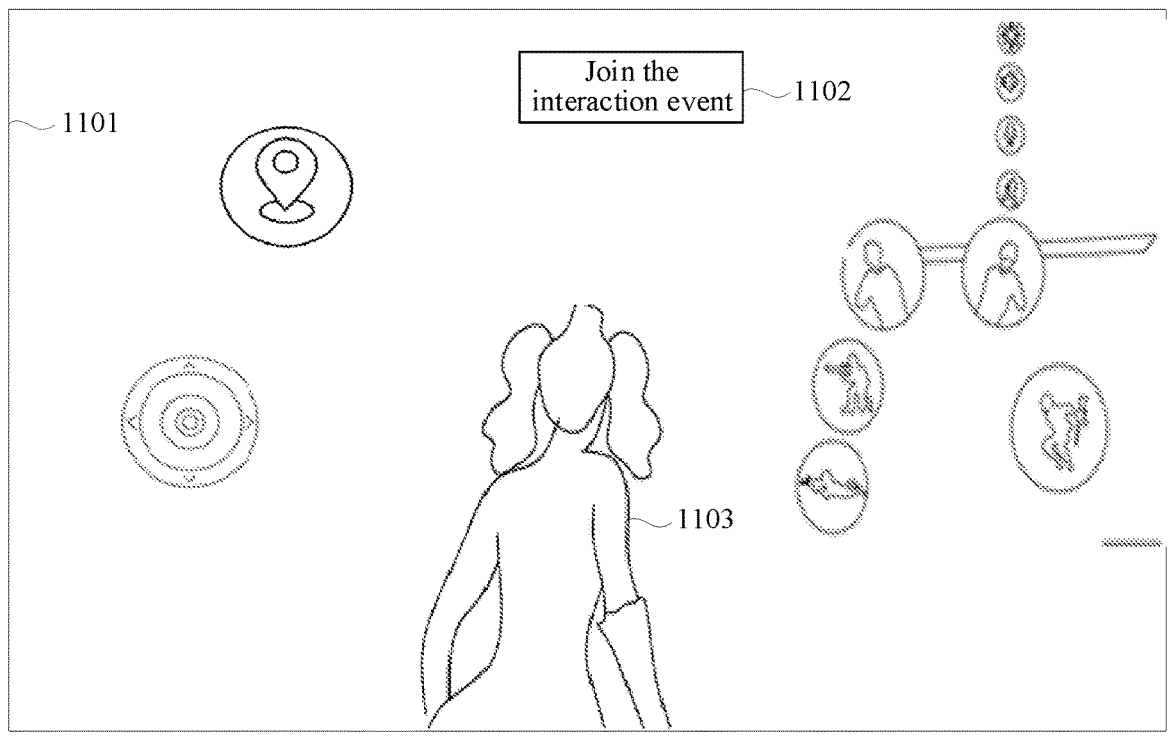
FIG. 11 is a schematic diagram of a third interactive object according to an embodiment of this disclosure.

In an example, when the target avatar with the first-ranked heat score triggers an interaction event, the second interactive object is displayed in the interface of other avatars. The second interactive object is used for asking other avatars whether to join the interaction event. In this embodiment, using an example in which other avatar is a first avatar, the second interactive object shown in FIG. 6 may be displayed in the display interface of the first avatar. If the user touches "Cancel", it is determined that the user does not join the interaction event. In this case, a third interactive object is displayed in the graphical user interaction interface in which the first avatar is locked. The third interactive object is used for joining an interaction event. FIG. 11 is a schematic diagram of a third interactive object according to an embodiment of this disclosure. When the interaction event is not ended, the third interactive object 1102 is displayed in the graphical user interaction interface 1101 in which the first avatar is locked. The first avatar 1103 joins the interaction event in response to a trigger operation performed by the first avatar 1103 on the third interactive object 1102. By touching the third interactive object at any time, the user can make the first avatar join the interaction event. If the user touches the third interactive object to join the interaction event, the following scenes may be displayed in the display interface of the first avatar.

Scene I: The first avatar alone is executing the interaction event. For example, the first avatar is dancing or singing. FIG. 7A is a first schematic diagram of executing a target interaction event according to an embodiment of this disclosure. The graphical user interaction interface in FIG. 7A is a graphical user interaction interface in which the first avatar is locked. This graphical user interaction interface only displays a picture of the first avatar executing the interaction event. The graphical user interaction interface 701A displays the first avatar 702A. The first avatar 702A is dancing in response to a call from the target avatar. The graphical user interaction interface 701A gives a view from a viewing angle of the first avatar.

Scene II: The first avatar and the target avatar jointly execute an interaction event. For example, the first avatar and the target avatar dance or sing together. FIG. 8A is a second schematic diagram of executing a target interaction event according to an embodiment of this disclosure. The graphical user interaction interface shown in FIG. 8A is a graphical user interaction interface in which the first avatar is locked. This graphical user interaction interface only displays a picture of the first avatar and the target avatar jointly executing the interaction event. The graphical user interaction interface 801A displays the first avatar 802A and the target avatar 803A. The first avatar 802A is dancing together with the target avatar 803A in response to a call from the target avatar 803A.

Scene III: The first avatar, the target avatar, and other avatars who join the interaction event jointly execute the interaction event. The avatars who join the interaction event include not only the first avatar and the target avatar, but also other avatars such as a second avatar. The number of other avatars who join the interaction event may be plural. That is, the number of the second avatar is at least one. The second avatar is an avatar watching the game rather than an avatar engaged in the game. In this way, a user watching the game can also join the interaction event. Alternatively, the second avatar may be a machine-controlled avatar that is randomly configured in the game. In this embodiment, using an example in which other avatar who joins the interaction event is the second avatar, the first avatar, the target avatar, and the second avatar may dance or sing together. FIG. 9 is a third schematic diagram of executing a target interaction event according to an embodiment of this disclosure. The graphical user interaction interface in FIG. 9 is a graphical user interaction interface 901 in which the first avatar is locked. This graphical user interaction interface displays a picture of the first avatar 902, the target avatar 903, and the second avatar 904 executing the interaction event together.

In an example, the following scenes may be displayed in the graphical user interaction interface in which the target avatar is locked.

Scene I: The first avatar alone is executing the interaction event. For example, the first avatar is dancing or singing. FIG. 7B is a first schematic diagram of executing a target interaction event according to an embodiment of this disclosure. The graphical user interaction interface in FIG. 7B is a graphical user interaction interface in which the target avatar is locked. This graphical user interaction interface only displays a picture of the first avatar executing the interaction event. The graphical user interaction interface 701B displays the first avatar 702B. The first avatar 702B is dancing in response to a call from the target avatar. The graphical user interaction interface 701B gives a view from a viewing angle of the target avatar.

Scene II: The first avatar and the target avatar jointly execute an interaction event. For example, the first avatar and the target avatar dance or sing together. FIG. 8B is a second schematic diagram of executing a target interaction event according to an embodiment of this disclosure. The graphical user interaction interface in FIG. 8B is a graphical user interaction interface in which the target avatar is locked. This graphical user interaction interface only displays a picture of the first avatar and the target avatar jointly executing the interaction event. The graphical user interaction interface 801B displays the first avatar 802B and the target avatar 803B. The first avatar 802B is dancing together with the target avatar 803B in response to a call from the target avatar 803B. The graphical user interaction interface 801B gives a view from a viewing angle of the target avatar.

In an example, the user may discretionarily choose to display, in the graphical user interaction interface, a game scene of executing the target interaction event. For example, the user may choose to display Scene II, or Scene II, or Scene III in the graphical user interaction interface. The picture of the first avatar executing the interaction event is displayed as required by the user, so as to meet requirements of different users and improve the users' game experience.

In some embodiments, the displaying, in the virtual scene, the picture of the second group of avatars executing the target interaction event, may be implemented by the following technical solution: displaying, in the virtual scene, a picture of the second group of avatars performing preset dance movements; or, displaying, in a target game application, a picture of the second group of avatars performing preset dance movements along with a target audio. The target audio starts to play when the target interaction event is triggered by the target avatar.

In an example, the interaction event may be: executing preset dance movements. The dance movements of different avatars may be the same or different. A picture of the avatars dancing together may be displayed in the game scene. Alternatively, the interaction event may be to dance to music. The music may be random, or the user who controls the target avatar chooses a piece of music from a preset set of music. The avatars who join the interaction event perform dancing movements along with the music. In this embodiment, the dance movements performed by the avatars jointly are added in the preparatory stage of the game, thereby increasing interactivity and fun of the game, and enhancing user experience.

Figure 12:
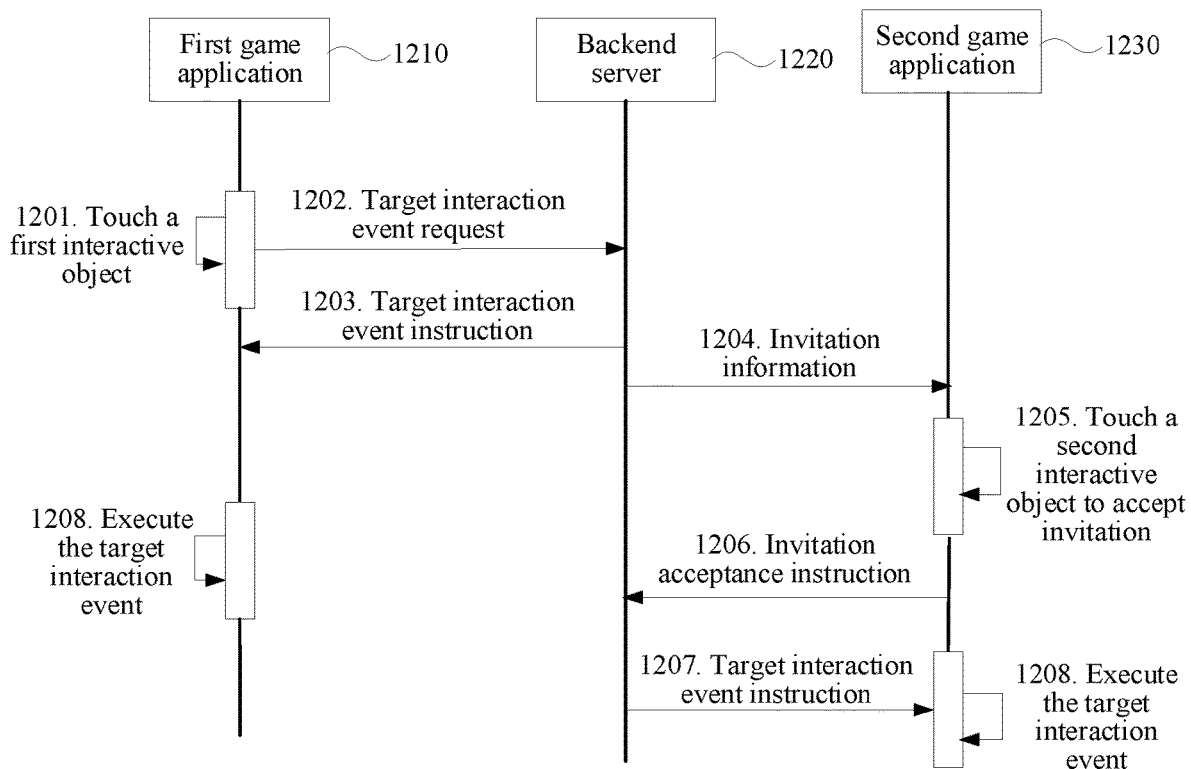
FIG. 12 is an interaction diagram according to an embodiment of this disclosure.

In an example, FIG. 12 is an interaction diagram according to an embodiment of this disclosure. The interaction includes information exchange between a first game application 1210 and a second game application 1230 and a backend server 1220. The first game application 1210 may be a game client to which the target avatar logs in. The second game application 1230 is a game client to which other avatar logs in, the other avatar being engaged in the same round of game as the target avatar. In step 1201, the user who controls the target avatar touches the first interactive object displayed in the graphical user interaction interface in the first game application 1210. In step 1202, a target interaction event request is sent to the backend server 1220. The target interaction event may be performing a dance movement. In step 1203, in response to the target interaction event request, the backend server 1220 sends a target interaction event instruction to the first game application 1210. The instruction may carry content of the target interaction event to be performed, for example, a dance movement. The target avatar in the first game application 1210 executes an interaction movement based on the target interaction event instruction. The backend server 1220 sends invitation information to the client to which other avatar logs in, the other avatar being an avatar other than the target avatar among the avatars engaged in a round of game. In this embodiment, using an example in which the second game application 1230 is the client to which other avatar logs in, in step 1204, the backend server 1220 sends invitation information to the second game application 1230, inviting other avatar to jointly perform the interaction event. In step 1205, the user who controls other avatar accepts the invitation by touching the second interactive object displayed in the graphical user interaction interface in the second game application 1230. In step 1206, if other avatar accepts the invitation, the second game application 1230 sends an invitation acceptance instruction to the server. In step 1207, the server sends a target interaction event instruction to the second game application 1230. In step 1208, the other avatar and the target avatar jointly perform the interaction movement. In this embodiment, the interaction event added in the preparatory stage of the game increases interactivity and fun of the game. The interaction event enriches interaction forms, and correlates a rating mechanism to the avatar's rights to trigger an interaction event. A show-up rate of top-ranked users is increased in the form of interaction, thereby catering for the users' show-off psychology, enhancing the users' fighting strength, and enhancing the game experience.

For ease of description in the foregoing method embodiments, each method is described as a combination of a series of operations. However, a person skilled in the art understands that this application is not limited to the order of the described operations because some steps according to this application may occur in other order or occur in parallel. In addition, a person skilled in the art understands that the embodiments described herein are exemplary embodiments, and the operations and modules mentioned herein are not necessarily required by this disclosure.

Here, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

Figure 13:
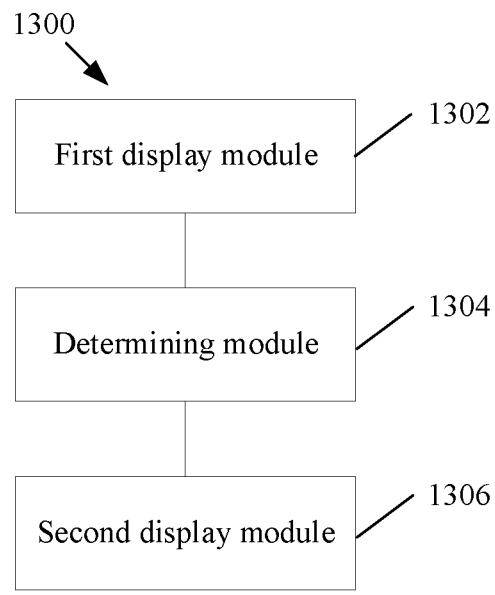
FIG. 13 is a schematic structural diagram of an apparatus for executing an interaction event according to an embodiment of this disclosure.

According to another aspect of embodiments of this disclosure, an apparatus for executing an interaction event is further provided to implement the foregoing method for executing an interaction event. As shown in FIG. 13, the apparatus 1300 includes: a first display module 1302, configured to display a picture of a preparatory stage of a round of game prior to start of the game in a target game application. The avatars engaged in the round of game include a first group of avatars. The apparatus 1300 further includes a determining module 1304, configured to determine a target avatar in the first group of avatars based on attribute information of the first group of avatars. The target avatar is set as allowed to trigger the target interaction event in the preparatory stage. The target interaction event is an interaction event that allows to be jointly executed by the first group of avatars. The apparatus 1300 further includes a second display module 1306, configured to display, in the virtual scene, when the target avatar triggers the target interaction event in the preparatory stage, a picture of a second group of avatars executing the target interaction event, the second group of avatars including an avatar who executes the target interaction event in the first group of avatars.

In some embodiments, the apparatus 1300 is configured to: when the target avatar is determined in the first group of avatars, display a first interactive object in a graphical user interaction interface in which the target avatar is locked. The first interactive object is used for triggering the target interaction event.

In some embodiments, the apparatus 1300 is configured to: when it is detected that a first touch operation is performed on the first interactive object, display a picture in the graphical user interaction interface in which the target avatar is locked. The picture shows that the target avatar is executing the target interaction event. A second interactive object is displayed in a graphical user interaction interface in which the first avatar is locked. The first avatar is an avatar other than the target avatar in the first group of avatars. The second interactive object is used for executing or shielding execution of the target interaction event based on an indicated operation.

In some embodiments, the apparatus 1300 is configured to: when the target avatar triggers the target interaction event in the preparatory stage, display a second interactive object in a graphical user interaction interface in which the first avatar is locked. The first avatar is an avatar other than the target avatar in the first group of avatars. The second interactive object is used for executing or shielding execution of the target interaction event based on an indicated operation. When it is detected that a second touch operation is performed on a second interactive object, a picture is displayed in the graphical user interaction interface in which the first avatar is locked. The picture shows that the first avatar is executing the target interaction event or showing that the target avatar and the first avatar are jointly executing the target interaction event. The second touch operation is used as an instruction to execute the target interaction event.

In some embodiments, the apparatus 1300 is configured to: after the picture of the preparatory stage prior to start of a round of game is displayed in the target game application, display avatar show animations of at least one avatar in the first group of avatars sequentially in the target game application. When the number of the at least one avatar is one, the at least one avatar is the target avatar. When the number of the at least one avatar is plural, display order of the at least one avatar being determined based on the attribute information of the first group of avatars.

In some embodiments, the apparatus 1300 is configured to: when the sequential displaying of the avatar show animations of at least one avatar in the first group of avatars comes to an end, display a first interactive object in a graphical user interaction interface in which the target avatar is locked. A distance between the first interactive object and the target avatar is less than a distance threshold. The first interactive object is used for triggering the target interaction event.

In some embodiments, the apparatus 1300 is configured to perform the following operations to implement the determining of a target avatar in the first group of avatars based on attribute information of the first group of avatars: determining that an avatar with a highest heat score in the first group of avatars is a target avatar. The heat score of each avatar in the first group of avatars is related to a costume prop obtained by the avatar.

In some embodiments, the apparatus 1300 is configured to determine a heat score of the first group of avatars based on the costume prop obtained by each avatar in the first group of avatars. The heat score of each avatar is positively correlated to at least one of: the number of costume props obtained by each avatar, the level of the costume prop obtained by each avatar, or a virtual resource cost for obtaining the costume prop by each avatar.

In some embodiments, the apparatus 1300 is configured to: when the target avatar triggers the target interaction event in the preparatory stage, display a second interactive object in a graphical user interaction interface in which the first avatar is locked. The first avatar is an avatar other than the target avatar in the first group of avatars. The second interactive object is used for executing or shielding execution of the target interaction event based on an indicated operation. When it is detected that a third touch operation is performed on the second interactive object, a third interactive object is displayed in the graphical user interaction interface in which the first avatar is locked. The third touch operation is used as an instruction to skip the target interaction event. The third interactive object is used as an instruction to execute the target interaction event. When it is detected that a fourth touch operation is performed on the third interactive object, a picture is displayed in the graphical user interaction interface in which the first avatar is locked. The picture shows that the first avatar is executing the target interaction event or shows that the target avatar and the first avatar are jointly executing the target interaction event.

In some embodiments, the apparatus 1300 is configured to perform the following operation to implement the displaying, in the virtual scene, the picture of the second group of avatars executing the target interaction event: displaying, in the virtual scene, a picture of the second group of avatars performing preset dance movements; or, displaying, in a target game application, a picture of the second group of avatars performing preset dance movements along with a target audio. The target audio starts to play when the target interaction event is triggered by the target avatar.

Figure 14:
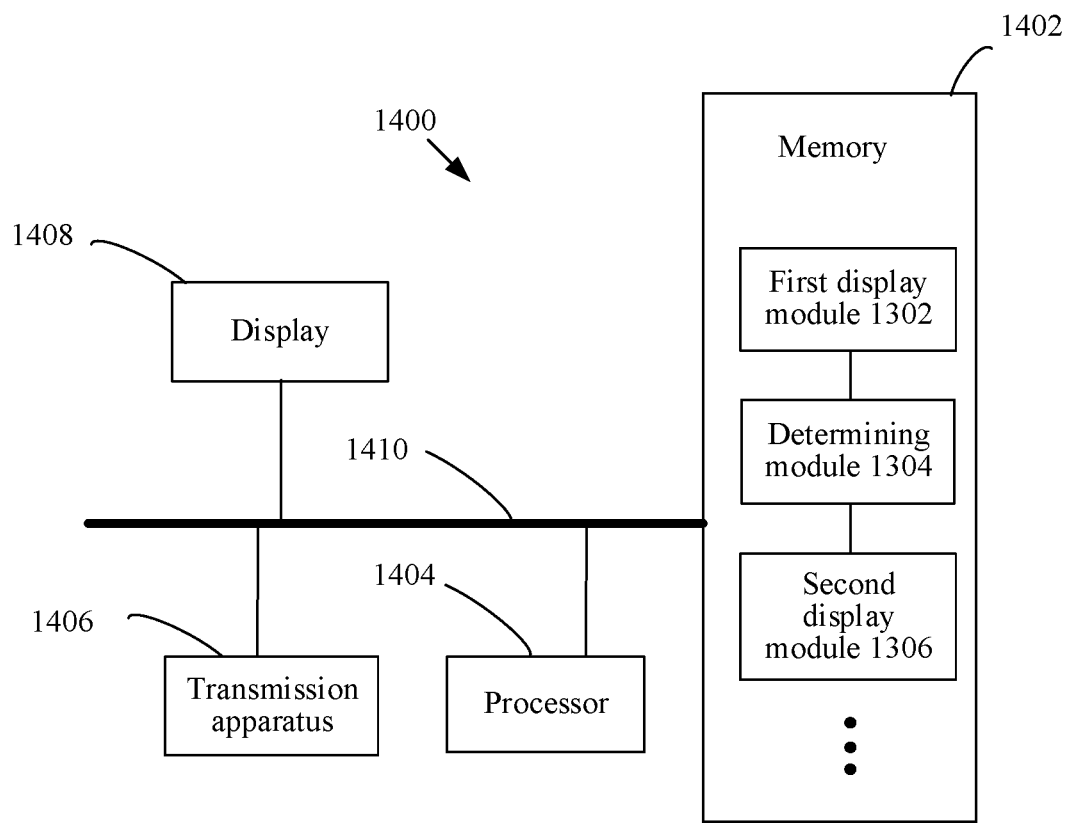
FIG. 14 is a schematic structural diagram of an electronic device according to an embodiment of this disclosure.

According to still another aspect of embodiments of this disclosure, an electronic device is further provided, and is configured to implement the foregoing method for executing an interaction event. The electronic device may be a terminal device or server shown in FIG. 1. This embodiment is described using an example in which the electronic device is a terminal device. As shown in FIG. 14, the electronic device 1400 includes a memory 1402 and a processor 1404. The memory 1402 stores a computer program. The processor 1404 is configured to perform steps of any one of the foregoing method embodiments by using a computer program.

In some embodiments, the electronic device 1400 may be located in at least one network device among a plurality of network devices of a computer network.

In some embodiments, the processor may be configured to perform the following steps by using a computer program:

S1: Display a picture of a preparatory stage of a round of game prior to start of the game in a target game application. The avatars engaged in the round of game include a first group of avatars.

S2: Determine a target avatar in the first group of avatars based on attribute information of the first group of avatars. The target avatar is set as allowed to trigger a target interaction event in the preparatory stage. The target interaction event is an interaction event that allows to be jointly executed by the first group of avatars.

S3: Display, in the target game application, when the target avatar triggers the target interaction event in the preparatory stage, the picture of the second group of avatars executing the target interaction event. The second group of avatars includes an avatar who executes the target interaction event in the first group of avatars.

In some embodiments, a person of ordinary skill in the art understands that the structure shown in FIG. 14 is merely for illustration. The electronic apparatus and the electronic device may be a terminal device instead, such as a smartphone (for example, an Android mobile phone, or an iOS mobile phone), a tablet computer, a palmtop computer, a mobile Internet device (MID), or a Pad. FIG. 14 does not limit the structures of the electronic apparatus and the electronic device. For example, the electronic apparatus and the electronic device may include more or fewer components than those shown in FIG. 14 (such as a network interface), or possess a different configuration than that shown in FIG. 14.

The memory 1402 may be configured to store software programs and modules, such as a program instruction/module corresponding to the method and apparatus for executing an interaction event according to the embodiments of this disclosure. The processor 1404 executes various functional applications and data processing by running the software program and module stored in the memory 1402, so as to implement the foregoing method for executing an interaction event. The memory 1402 may include a high-speed random access memory, and may further include a non-volatile memory, for example, at least one magnetic storage apparatus, a flash memory, or other non-volatile solid-state memories. In some embodiments, the memory 1402 may further include memories disposed remotely from the processor 1404. The remote memories may be connected to the terminal by a network. Examples of the network include, but are not limited to, the Internet, a corporate intranet, a local area network, a mobile communications network, and any combination thereof. The memory 1402 may be specifically configured to, but without limitation, store information such as attribute information of avatars. In an example, as shown in FIG. 14, the memory 1402 may include, but without limitation, the first display module 1302, the determining module 1304, and the second display module 1306 in the foregoing apparatus for executing an interaction event. In addition, the memory may further include, but without limitation, other modules and units in the apparatus for executing an interaction event. Details are omitted herein.

In some embodiments, the transmission apparatus 1406 is configured to receive or transmit data through a network. Specific examples of the network may include a wired network and a radio network. In an example, the transmission apparatus 1406 includes a network adapter (NIC). The network adapter may be connected to other network devices and routers through a network cable so as to communicate with the Internet or a local area network. In an example, the transmission apparatus 1406 is a radio frequency (RF) module configured to communicate with the Internet in a wireless manner.

In addition, the electronic device 1400 further includes a display 1408, configured to display a picture of a preparatory stage prior to start of a round of game, and display a picture of a second group of avatars executing a target interaction event. The electronic device further includes a connection bus 1410, configured to connect various modular components in the electronic device.

In other embodiments, the terminal device or server may be a node in a distributed system. The distributed system may be a blockchain system. The blockchain system may be a distributed system formed by connecting the plurality of nodes in the form of network communication. A peer-to-peer (P2P) network may be formed between the nodes. Any form of computing devices such as electronic devices like a server or a terminal may become a node in the blockchain system by joining the peer-to-peer network.

According to an aspect of this disclosure, a computer program product or a computer program is provided. The computer program product or the computer program includes a computer instruction. The computer instruction is stored in a computer-readable storage medium. The processor of the electronic device reads the computer instruction in the computer-readable storage medium. The processor executes the computer instruction to cause the electronic device to implement the methods provided in various implementations described above. The computer program is configured to perform the steps in any one of the foregoing method embodiments when running.

In some embodiments, the computer-readable storage medium may be configured to store a computer program used for performing the following steps:

S1: Display a picture of a preparatory stage prior to start of an interaction process in a virtual scene. Avatars engaged in an interaction process include a first group of avatars.

S2: Determine a target avatar in the first group of avatars based on attribute information of the first group of avatars. The target avatar is set as allowed to trigger a target interaction event in the preparatory stage. The target interaction event is an interaction event that allows to be jointly executed by the first group of avatars.

S3: Display, in the target game application, when the target avatar triggers the target interaction event in the preparatory stage, the picture of the second group of avatars executing the target interaction event. The second group of avatars includes an avatar who executes the target interaction event in the first group of avatars.

In some embodiments, A person of ordinary skill in the art understands that all or part of the steps of various methods in the foregoing embodiments may be implemented by a program instructing relevant hardware of the terminal device. The program may be stored in a computer-readable storage medium. The storage medium may include: a flash disk, a read-only memory (ROM), a random access device (RAM), a magnetic disk, an optical disk, or the like.

An embodiment of this disclosure provides a computer program product or a computer program. The computer program product or the computer program includes a computer instruction. The computer instruction is stored in a computer-readable storage medium. The processor of the electronic device reads the computer instruction in the computer-readable storage medium. The processor executes the computer instruction to cause the electronic device to implement the foregoing method for executing an interaction event according to an embodiment of this disclosure.

The serial numbers of the embodiments of this disclosure are for ease of description, and do not represent advantages or disadvantages of the embodiments.

The integrated units in the foregoing embodiments, if implemented in the form of a software functional unit and sold or used as a stand-alone product, may be stored in the foregoing computer-readable storage medium. Based on such an understanding, the essence of the technical solution of this disclosure, or the part making contributions to the related art, or all or part of the technical solution may be implemented in the form of a software product. The computer software product is stored in a storage medium, and includes several instructions used for instructing one or more electronic devices (such as a personal computer, a server, or a network device) to perform all or part of the steps of the method according to each embodiment of this disclosure.

In the foregoing embodiments of this disclosure, the description about each embodiment emphasizes a different facet. For a part that is not detailed in one embodiment, refer to the relevant description in other embodiments.

In the embodiments provided in this disclosure, it is understandable that the disclosed client may be implemented in other forms. The described apparatus embodiment is merely exemplary. For example, the division of the apparatus into units is merely a division from a perspective of logical functions, and the apparatus may be divided in other manners in practical implementations. For example, a plurality of units or components may be combined or integrated into another system, or some features may be ignored or not performed. In addition, the displayed or discussed couplings between different parts or direct couplings or communications connections may be indirect couplings or communications connections implemented through some interfaces, units, or modules, and may be implemented electrically or in other forms.

The units described as stand-alone components above may be separated physically or not. The components illustrated as units may be physical units or not, and specifically, may be located in one place, or distributed on a plurality of network elements. Some or all of the units may be selected according to actual needs to achieve the objectives of the solutions of the embodiments hereof.

In addition, functional units in the embodiments of this disclosure may be integrated into one processing unit, or each of the units may exist alone physically, or two or more units may be integrated into one unit. The integrated unit may be implemented in hardware form, or may be implemented in the form of a software functional unit.

What is described above is merely exemplary implementations of this disclosure. Various improvements and refinements, which may be made by a person of ordinary skill in the art without departing from the principles of this disclosure, fall within the protection scope of this disclosure.

What is claimed is:

1. A method for executing an interaction event, performed by an electronic device, and the method comprising:
    displaying a picture of a preparatory stage prior to start of an interaction process in a virtual scene, a first group of avatars engaging in the interaction process, and the interaction process comprising one or more interaction events;
    selecting a target avatar from the first group of avatars based on attribute information of the first group of avatars such that only the target avatar being able to trigger a target interaction event in the preparatory stage, and the target interaction event being an interaction event that, among the one or more interaction events, allows to be jointly executed by the first group of avatars; and
    in response to the target avatar triggering the target interaction event in the preparatory stage, displaying, in the virtual scene, a picture of a second group of avatars executing the target interaction event, the second group of avatars comprising an avatar who executes the target interaction event in the first group of avatars.

2. The method of claim 1, the method further comprises:
    displaying, in response to the target avatar being determined in the first group of avatars, a first interactive object in a graphical user interaction interface in which the target avatar is locked, the first interactive object being for triggering the target interaction event.

3. The method of claim 2, the method further comprises:
    displaying, in response to detecting that a first touch operation is performed on the first interactive object, a picture in the graphical user interaction interface in which the target avatar is locked, the picture showing that the target avatar is executing the target interaction event; and
    displaying a second interactive object in a graphical user interaction interface in which a first avatar is locked, the first avatar being an avatar other than the target avatar in the first group of avatars, and the second interactive object being for executing or shielding execution of the target interaction event based on an indicated operation.

4. The method of claim 1, the method further comprises:
    displaying, in response to the target avatar triggering the target interaction event in the preparatory stage, a second interactive object in a graphical user interaction interface in which a first avatar is locked, the first avatar being an avatar other than the target avatar in the first group of avatars, and the second interactive object being for executing or shielding execution of the target interaction event based on an indicated operation; and
    displaying, in response to detecting that a second touch operation is performed on a second interactive object, a picture in the graphical user interaction interface in which the first avatar is locked, the picture showing that the first avatar is executing the target interaction event or showing that the target avatar and the first avatar are jointly executing the target interaction event, and the second touch operation being used as an instruction to execute the target interaction event.

5. The method of claim 1, wherein after the displaying the picture of the preparatory stage prior to start of the interaction process in the virtual scene, the method further comprises:
    sequentially displaying, in a target game application, avatar show animations of at least one avatar in the first group of avatars, in response to a number of the at least one avatar being one, the at least one avatar being the target avatar, and in response to the number of the at least one avatar being greater than one, display order of the at least one avatar being determined based on the attribute information of the first group of avatars.

6. The method of claim 5, the method further comprises:
    displaying, in response to the sequential displaying of the avatar show animations of the at least one avatar in the first group of avatars coming to an end, a first interactive object in a graphical user interaction interface in which the target avatar is locked, the first interactive object being for triggering the target interaction event.

7. The method of claim 6, wherein a distance between the first interactive object and the target avatar is less than a distance threshold.

8. The method of claim 1, wherein the attribute information comprises a heat score, and the determining the target avatar comprises:
   determining an avatar with a highest heat score in the first group of avatars as the target avatar, the heat score of an avatar in the first group of avatars being related to a costume prop obtained by the avatar.

9. The method of claim 8, the method further comprises:
   determining a heat score of an avatar in the first group of avatars based on the costume prop obtained by the avatar, the heat score of the avatar being positively correlated to at least one of: a number of costume props obtained by the avatar, a level of the costume prop obtained by the avatar, or a virtual resource cost for obtaining the costume prop by the avatar.

10. The method of claim 1, the method further comprises:
    displaying, in response to the target avatar triggering the target interaction event in the preparatory stage, a second interactive object in a graphical user interaction interface in which a first avatar is locked, the first avatar being an avatar other than the target avatar in the first group of avatars, and the second interactive object being for executing or shielding execution of the target interaction event based on an indicated operation;
    displaying, in response to detecting that a third touch operation is performed on the second interactive object, a third interactive object in the graphical user interaction interface in which the first avatar is locked, the third touch operation being used as an instruction to skip the target interaction event, and the third interactive object being used as an instruction to execute the target interaction event; and
    displaying, in response to detecting that a fourth touch operation is performed on the third interactive object, a picture in the graphical user interaction interface in which the first avatar is locked, the picture showing that the first avatar is executing the target interaction event or showing that the target avatar and the first avatar are jointly executing the target interaction event.

11. The method of claim 1, wherein the displaying the picture of the second group of avatars comprises:
    displaying, in a target game application, a picture of the second group of avatars performing preset dance movements.

12. The method of claim 1, wherein the displaying the picture of the second group of avatars comprises:
    displaying, in a target game application, a picture of the second group of avatars performing preset dance movements along with a target audio, the target audio starting to play in response to the target interaction event being triggered by the target avatar.

13. An apparatus for executing an interaction event, comprising:
    a memory operable to store computer-readable instructions; and
    a processor circuitry operable to read the computer-readable instructions, the processor circuitry when executing the computer-readable instructions is configured to:
    display a picture of a preparatory stage prior to start of an interaction process in a virtual scene, a first group of avatars engaging in the interaction process, and the interaction process comprising one or more interaction events;
    select a target avatar from the first group of avatars based on attribute information of the first group of avatars such that only the target avatar being able to trigger a target interaction event in the preparatory stage, and the target interaction event being an interaction event that, among the one or more interaction events, allows to be jointly executed by the first group of avatars; and
    in response to the target avatar triggering the target interaction event in the preparatory stage, display, in the virtual scene, a picture of a second group of avatars executing the target interaction event, the second group of avatars comprising an avatar who executes the target interaction event in the first group of avatars.

14. The apparatus of claim 13, the processor circuitry is further configured to:
    display, in response to the target avatar being determined in the first group of avatars, a first interactive object in a graphical user interaction interface in which the target avatar is locked, the first interactive object being for triggering the target interaction event.

15. The apparatus of claim 14, the processor circuitry is further configured to:
    display, in response to detecting that a first touch operation is performed on the first interactive object, a picture in the graphical user interaction interface in which the target avatar is locked, the picture showing that the target avatar is executing the target interaction event; and
    display a second interactive object in a graphical user interaction interface in which a first avatar is locked, the first avatar being an avatar other than the target avatar in the first group of avatars, and the second interactive object being for executing or shielding execution of the target interaction event based on an indicated operation.

16. The apparatus of claim 13, the processor circuitry is further configured to:
    display, in response to the target avatar triggering the target interaction event in the preparatory stage, a second interactive object in a graphical user interaction interface in which a first avatar is locked, the first avatar being an avatar other than the target avatar in the first group of avatars, and the second interactive object being for executing or shielding execution of the target interaction event based on an indicated operation; and
    display, in response to detecting that a second touch operation is performed on a second interactive object, a picture in the graphical user interaction interface in which a first avatar is locked, the picture showing that the first avatar is executing the target interaction event or showing that the target avatar and the first avatar are jointly executing the target interaction event, and the second touch operation being used as an instruction to execute the target interaction event.

17. The apparatus of claim 13, wherein the processor circuitry is further configured to:
    sequentially display, in a target game application, avatar show animations of at least one avatar in the first group of avatars, the at least one avatar being the target avatar in response to a number of the at least one avatar being one, and display order of the at least one avatar being determined based on the attribute information of the first group of avatars in response to the number of the at least one avatar being greater than one.

18. The apparatus of claim 17, the processor circuitry is further configured to:
   display, in response to the sequential displaying of the avatar show animations of the at least one avatar in the first group of avatars coming to an end, a first interactive object in a graphical user interaction interface in which the target avatar is locked, the first interactive object being for triggering the target interaction event.

19. The apparatus of claim 13, wherein the attribute information comprises a heat score, and the processor circuitry is configured to:
   determine an avatar with a highest heat score in the first group of avatars as the target avatar, the heat score of the avatar in the first group of avatars being related to a costume prop obtained by the avatar.

20. A non-volatile machine-readable media, having instructions stored on the machine-readable media, the instructions configured to, when executed, cause a machine to:
   display a picture of a preparatory stage prior to start of an interaction process in a virtual scene, a first group of avatars engaging in the interaction process, and the interaction process comprising one or more interaction events;

select a target avatar from the first group of avatars based on attribute information of the first group of avatars such that only the target avatar being able to trigger a target interaction event in the preparatory stage, and the target interaction event being an interaction event that, among the one or more interaction events, allows to be jointly executed by the first group of avatars; and in response to the target avatar triggering the target interaction event in the preparatory stage, display, in the virtual scene, a picture of a second group of avatars executing the target interaction event, the second group of avatars comprising an avatar who executes the target interaction event in the first group of avatars.

* * * * *